(12) United States Patent
Oki et al.

(10) Patent No.: US 8,305,529 B2
(45) Date of Patent: Nov. 6, 2012

(54) PROCESS AND APPARATUS FOR PRODUCING OPTICAL COMPENSATION FILM, OPTICAL COMPENSATION FILM, POLARIZER, AND LIQUID-CRYSTAL DISPLAY

(75) Inventors: Kazuhiro Oki, Minami-Ashigara (JP); Hirokazu Nishimura, Odawara (JP); Akihiro Matsuoka, Odawara (JP); Kazuhiro Shiojiri, Minami-Ashigara (JP); Shun Nakamura, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 243 days.

(21) Appl. No.: 12/933,650

(22) PCT Filed: Mar. 13, 2009

(86) PCT No.: PCT/JP2009/054919
§ 371 (c)(1),
(2), (4) Date: Sep. 20, 2010

(87) PCT Pub. No.: WO2009/116470
PCT Pub. Date: Sep. 24, 2009

(65) Prior Publication Data
US 2011/0019131 A1    Jan. 27, 2011

(30) Foreign Application Priority Data

Mar. 21, 2008  (JP) .................................. 2008-073745

(51) Int. Cl.
*G02F 1/1335*    (2006.01)

(52) U.S. Cl. ........................................ 349/117; 349/187

(58) Field of Classification Search ................. 349/117, 349/187
See application file for complete search history.

(56) References Cited

U.S. PATENT DOCUMENTS

| 5,747,121 A | 5/1998 | Okazaki et al. |
| 5,853,801 A | 12/1998 | Suga et al. |

FOREIGN PATENT DOCUMENTS

DE    196 55 379 B4    2/2008

(Continued)

OTHER PUBLICATIONS

International Search Report—dated Apr. 28, 2009 for PCT/JP2009/054919.

(Continued)

*Primary Examiner* — Phu Vu
(74) *Attorney, Agent, or Firm* — Birch, Stewart, Kolasch & Birch, LLP

(57) ABSTRACT

A process for producing an optical compensation film comprises a liquid crystal layer application step (10) of applying a liquid crystal layer coating solution containing a liquid crystal compound to an alignment layer on a surface of a transparent substrate (4c) that is continuously transported; a liquid crystal layer drying step (11) of drying the liquid crystal layer; a cooling and curing step of curing the liquid crystal layer while cooling the liquid crystal layer to a temperature lower than a drying temperature used in the drying step; and a heating and curing step of curing the alignment layer while heating the alignment layer to a temperature higher than a cooling temperature used in the cooling and curing step. The process enables the durability and damage resistance as well as the optical characteristics of the optical compensation film to be independently controlled.

15 Claims, 6 Drawing Sheets

FOREIGN PATENT DOCUMENTS

| | | |
|---|---|---|
| JP | 9-73081 A | 3/1997 |
| JP | 9-152509 A | 6/1997 |
| JP | 2006-154709 A | 6/2006 |
| JP | 2006-267628 A | 10/2006 |
| JP | 2006-293315 A | 10/2006 |
| JP | 2007-86248 A | 4/2007 |
| JP | 2007-101658 A | 4/2007 |
| JP | 2007-264112 A | 10/2007 |
| JP | 2007-264449 A | 10/2007 |

OTHER PUBLICATIONS

Maruzen Co., Ltd., "Dictionary of Chemical Engineering", Oct. 1980, pp. 707-712.

International Preliminary Report on Patentability and Written Opinion of the International Searching Authority dated Sep. 30, 2010 for Application No. PCT/JP2009/054919 (PCT/IB/338, PCT/IB/326 PCT/IB/373 and PCT/ISA/237).

FIG.10

| | EXAMPLE 1 | EXAMPLE 2 | EXAMPLE 3 | COMPARATIVE EXAMPLE 1 | EXAMPLE 4 | COMPARATIVE EXAMPLE 2 | EXAMPLE 5 | EXAMPLE 6 | EXAMPLE 7 | EXAMPLE 8 |
|---|---|---|---|---|---|---|---|---|---|---|
| DRYING TEMPERATURE (°C) | 130 | 130 | 130 | 130 | 130 | 130 | 130 | 110 | 140 | 145 |
| ULTRAVIOLET RADIATION TEMPERATURE DURING COOLING (°C) | 80 | 50 | 80 | 110 | 25 | 80 | 80 | 80 | 80 | 80 |
| ULTRAVIOLET RADIATION TEMPERATURE DURING HEATING (°C) | 110 | 110 | 130 | 110 | 110 | 80 | 140 | 110 | 110 | 110 |
| ALIGNMENT | EXCELLENT | EXCELLENT | EXCELLENT | EXCELLENT | GOOD | EXCELLENT | EXCELLENT | PASS | PASS | PASS |
| CURING OF ALIGNMENT LAYER | EXCELLENT | GOOD | EXCELLENT | EXCELLENT | PASS | FAIL | GOOD | GOOD | GOOD | GOOD |
| CURING OF OPTICALLY ANISOTROPIC LAYER | EXCELLENT | GOOD | EXCELLENT | EXCELLENT | PASS | FAIL | GOOD | GOOD | GOOD | GOOD |
| FILM FLATNESS | GOOD | GOOD | GOOD | GOOD | GOOD | GOOD | PASS | GOOD | PASS | PASS |
| CONTRAST/VIEWING ANGLE | GOOD | EXCELLENT | GOOD | FAIL | EXCELLENT | GOOD | GOOD | PASS | GOOD | GOOD |
| HUE CHARACTERISTICS | GOOD | GOOD | EXCELLENT | GOOD | PASS | GOOD | GOOD | PASS | GOOD | PASS |
| OVERALL EVALUATION | EXCELLENT | EXCELLENT | EXCELLENT | FAIL | PASS | FAIL | PASS | PASS | PASS | PASS |

PROCESS AND APPARATUS FOR PRODUCING OPTICAL COMPENSATION FILM, OPTICAL COMPENSATION FILM, POLARIZER, AND LIQUID-CRYSTAL DISPLAY

TECHNICAL FIELD

The present invention relates to a process and apparatus for producing an optical compensation film, an optical compensation film, a polarizer, and a liquid crystal display; and, in particular, to a process and apparatus for producing an optical compensation film having improved durability and damage resistance as well as improved optical characteristics, an optical compensation film, a polarizer, and a liquid crystal display.

BACKGROUND ART

Optical compensation films have been conventionally produced using a process wherein a solution in which a liquid crystal compound is dissolved in an organic solvent is prepared, and the solution is applied, dried and cured, thereby continuously producing an optical compensation film. These optical compensation films are required to have uniform alignment of liquid crystals. Thus, uniform performance is imparted by applying a liquid crystal compound to a transparent substrate to which an alignment film has been applied, drying the liquid crystal compound at a high temperature, and then polymerizing and curing the compound using light or heat.

In particular, photo-curing using ultraviolet radiation or the like is an efficient means in terms of the productivity of the optical compensation film. As means for increasing the degree of curing in order to improve the durability and damage resistance of an optical compensation film, processes wherein the film is cured using light radiation while heating the film (to 100° C. or more) have been disclosed (see Patent Documents 1 to 3).

Patent Document 1: Japanese Patent Application Laid-Open No. 2006-267628
Patent Document 2: Japanese Patent Application Laid-Open No. 2006-154709
Patent Document 3: Japanese Patent Application Laid-Open No. 2007-101658

DISCLOSURE OF THE INVENTION

Problems to be Solved by the Invention

An optical compensation film includes an alignment film layer for aligning the liquid crystal compound of an optically anisotropic layer. Because the alignment film layer easily absorbs moisture, when a liquid crystal display incorporating a polarizer wherein the optical compensation film and a polarizing element are laminated is placed under high-temperature, high-humidity conditions, the polarizer absorbs moisture and undergoes expansion and contraction. This causes a distortion between the polarizer and a glass substrate in a liquid crystal cell. Since the optically anisotropic layer is thin and fragile compared to the substrate and polarizing element, it may not withstand the distortion and may become cracked, resulting in impaired display quality. For these reasons, there is a need to improve the durability of the optically anisotropic layer.

Furthermore, when the optical compensation film is handled, for example, during transport of the roll of the optical compensation film, the optically anisotropic layer disposed on the surface of the optical compensation film may be damaged, resulting in point defects in the liquid crystal display portion. Therefore, from this viewpoint, there is also a need to improve the damage resistance.

As disclosed in Patent Documents 1 to 3, the durability and damage resistance can be improved by increasing the curing temperature of the alignment film layer and optically anisotropic layer. However, increasing the curing temperature has posed the problem of impairment of the optical compensation function due to a change in the optical characteristics of the film, and, in particular, the problem of degraded upward viewing angle/contrast as a display quality when the film is mounted in a liquid crystal panel.

The present invention was accomplished in view of the foregoing circumstances. An object of the present invention is to provide a process and apparatus for producing an optical compensation film wherein the durability and damage resistance, as well as the optical characteristics can be independently controlled, an optical compensation film obtained by the process, a polarizer, and a liquid crystal display.

Means for Solving the Problems

In order to achieve the above-mentioned object, a first aspect of the present invention provides a process for producing an optical compensation film comprising a liquid crystal layer application step of applying a liquid crystal layer coating solution containing a liquid crystal compound to an alignment layer on a surface of a transparent substrate that is continuously transported; a liquid crystal layer drying step of drying the liquid crystal layer; a cooling and curing step of curing the liquid crystal layer while cooling the liquid crystal layer to a temperature lower than a drying temperature used in the drying step; and a heating and curing step of curing the alignment layer while heating the alignment layer to a temperature higher than a cooling temperature used in the cooling and curing step.

Compared to the alignment layer, the liquid crystal layer can be readily cured using a less amount of ultraviolet radiation during curing. Therefore, when the liquid crystal layer is cured under the same conditions as those for the alignment layer, the optical characteristics of the liquid crystal layer will change, resulting in a poor quality. According to the first aspect, the liquid crystal layer is dried, after which the temperature is lowered, and the liquid crystal layer is cured first. Subsequently, the temperature is raised by heating, and then the alignment layer is cured. Although the temperature is raised in the heating and curing step, the liquid crystal layer has already been cured; therefore, an optical compensation film can be produced without changing the optical characteristics. Further, both the alignment layer and optically anisotropic layer are cured at temperatures sufficient for curing, therefore, sufficient durability and damage resistance can be ensured.

According to a second aspect, in the process according to the first aspect, the liquid crystal layer and alignment layer are cured by ultraviolet radiation.

The second aspect defines the method for curing the liquid crystal layer and alignment layer. Curing is preferably performed using ultraviolet rays.

According to a third aspect, in the process according to the first or second aspect, the temperature of the liquid crystal layer in the liquid crystal layer drying step is 120° C. or more and 140° C. or less; the temperature of the liquid crystal layer in the cooling and curing step is 40° C. or more and 100° C. or less; and the temperature of the alignment layer in the heating and curing step is 100° C. or more and 135° C. or less.

The third aspect defines the temperature in each of these steps. By defining the temperature in each step within the above-mentioned range, it is possible to complete curing of the layer in each step, enabling the production of a film having an excellent quality and optical characteristics.

According to a fourth aspect, in the process according to any of the first to third aspects, the cooling and curing step comprises a cooling step of lowering the temperature of the liquid crystal layer; and a curing step of curing the liquid crystal layer while maintaining the temperature after cooling.

In the process according to the fourth aspect, the liquid crystal layer is cured by the cooling and curing step separated into the cooling step and curing step. This enables the temperature to be precisely adjusted in the curing step, thereby producing an optical compensation film having a higher quality.

According to a fifth aspect, in the process according to any of the first to fourth aspects, the heating and curing step comprises a heating step of heating the alignment layer; and a curing step of curing the alignment layer while maintaining the temperature after heating.

In the process according to the fifth aspect, the alignment layer is cured by the heating and curing step separated into the heating step and curing step. This enables the temperature to be precisely controlled, as in the curing of the liquid crystal layer, thereby producing an optical compensation film having a higher quality.

In order to achieve the above-mentioned object, a sixth aspect of the present invention provides an apparatus for producing an optical compensation film comprising a substrate transporting apparatus that continuously transports a transparent substrate having an alignment layer formed on a surface of the substrate; a coating apparatus that applies a liquid crystal layer coating solution containing a liquid crystal compound to the transparent substrate; a drying apparatus that dries the liquid crystal layer coating solution to form a liquid crystal layer; a curing apparatus that cures the alignment layer and liquid crystal layer; a cooling apparatus present in an upstream portion of the curing apparatus, the cooling apparatus cooling the alignment layer and liquid crystal layer; and a heating apparatus present in a downstream portion of the curing apparatus, the heating apparatus heating the alignment layer and liquid crystal layer.

The sixth aspect provides an apparatus configured to perform the process for producing an optical compensation film according to the first aspect. According to the sixth aspect, similar effects as obtained in the first aspect can be achieved.

According to a seventh aspect, the curing apparatus in the apparatus according to the sixth aspect is an ultraviolet radiation apparatus.

The seventh aspect defines the curing apparatus. An ultraviolet radiation apparatus is preferably used as the curing apparatus.

According to an eighth aspect, in the apparatus according to the sixth or seventh aspect, the curing apparatus comprises four or more zones, wherein two or more zones upstream of the curing apparatus each comprise the cooling apparatus, and at least one of the zones comprises a curing portion; and two or more zones downstream of the curing apparatus each comprise the heating apparatus, and at least one of the zones comprises a curing portion; and wherein the temperature in each of the four or more zones can be controlled.

In the apparatus according to the eighth aspect, the curing apparatus comprises four or more zones, wherein the temperature in each zone can be controlled. Further, the curing apparatus comprises zones having the cooling apparatus and zones having the heating apparatus, such that curing can be performed after changing the temperatures of the alignment layer and liquid crystal layer to desired temperatures. Therefore, the temperatures of the alignment layer and liquid crystal layer can be controlled more precisely, enabling the production of an optical film having a high quality.

According to a ninth aspect, in the apparatus according to any of the sixth to eighth aspects, the cooling apparatus is cooling air from a nozzle or slit plate, or a cooling roll capable of adjusting temperature.

According to a tenth aspect, in the apparatus according to any of the sixth to ninth aspects, the heating apparatus is a heating roll capable of adjusting temperature.

The ninth aspect defines the cooling apparatus, and the tenth aspect defines the heating apparatus. It is preferable to use cooling air or a cooling roll as the cooling apparatus, and use a heating roll as the heating apparatus.

According to an eleventh aspect, in the apparatus according to any of the sixth to tenth aspects, the temperature of the liquid crystal layer in the drying apparatus is 120° C. or more and 140° C. or less; the temperature of the liquid crystal layer in the cooling apparatus is 40° C. or more and 100° C. or less; and the temperature of the alignment layer in the heating apparatus is 100° C. or more and 135° C. or less.

The eleventh aspect defines the range of temperatures in each of these apparatuses. By defining the temperature in each apparatus within the above-mentioned range, it is possible to complete curing of the layers in the curing apparatus, enabling the production of a film having an excellent quality and optical characteristics.

A twelfth aspect of the present invention provides, in order to achieve the above-mentioned object, an optical compensation film produced by the process for producing an optical compensation film according to any of the first to fifth aspects.

A thirteenth aspect of the present invention provides, in order to achieve the above-mentioned object, a polarizer comprising at least one optical compensation film according to the twelfth aspect.

A fourteenth aspect of the present invention provides, in order to achieve the above-mentioned object, a liquid crystal display comprising the optical compensation film according to the twelfth aspect, or the polarizer according to the thirteenth aspect. Thus, the liquid crystal display according to the fourteenth aspect has good viewing angle characteristics without impairing the display quality even under high-temperature, high-humidity conditions.

Advantages of the Invention

According to each of the aspects of the present invention, an optical compensation film wherein the damage resistance and durability under high-temperature, high-humidity conditions have been improved without impairment of the alignment and optical characteristics can be provided, as well as a process and apparatus for producing the optical compensation film can be provided. Further, a polarizer wherein the optical compensation film and a polarizing element are laminated, and a liquid crystal display can be provided.

BRIEF DESCRIPTION OF THE DRAWINGS

FIG. 10 is a table showing the results of an overall assessment of Examples 1 to 8 and Comparative Examples 1 and 2 in terms of alignment, curing of the alignment layer, curing of the optically anisotropic layer, film flatness, viewing angle characteristics, and hue.

DESCRIPTION OF SYMBOLS

1a . . . feeder, 2 . . . surface-dust remover, 3 . . . coater, 4a . . . transparent substrate, 4b . . . transparent substrate on which an alignment layer has been formed, 4c . . . transparent substrate after rubbing treatment, 5a . . . film roll, 5 . . . drying zone, 6 . . . guide roller, 7 . . . dust remover, 8 . . . rubbing roller, 9 . . . surface-dust remover, 10 . . . coater, 11 . . . drying zone, 12, 100, 101 . . . ultraviolet radiation apparatus, 13 . . . inspection apparatus, 14 . . . protective film, 15 . . . laminator, 16 . . . winder, 61 . . . wire bar coater, 62 . . . backup, 63 . . . bearing, 64 . . . coupling, 65 . . . motor, 66 . . . primary-side solution reservoir, 67 . . . secondary-side solution reservoir, 68 . . . overflow solution reservoir, 69A . . . solution inlet, 69B . . . solution outlet, 72 . . . solution-surface regulating plate, 73 . . . filter, 75 . . . viscosity adjusting chamber, 76 . . . connecting pipe, 77 . . . pump, 78 . . . densimeter, 81 . . . wire bar coater, 82 . . . rectifying plate, 83a . . . coating-chamber air inlet, 83b . . . coating-chamber air outlet, 84 . . . transparent substrate having a liquid crystal layer, 85a, 85b . . . wire gauze, 86 . . . drying zone, 88 . . . porous plate, 89 . . . heating zone, 102 . . . ultraviolet lamp, 104 . . . cooling roll, 106 . . . heating roll, 108 . . . cooling-air jet, 110 . . . hot-air jet, 112a, 112b, 114a, 114b, 114c, 114d . . . zone, 116 . . . roller

BEST MODE FOR CARRYING OUT THE INVENTION

Referring to the attached drawings, preferred embodiments of the process and apparatus for producing an optical compensation film of the present invention will be described below.

Figure 1:
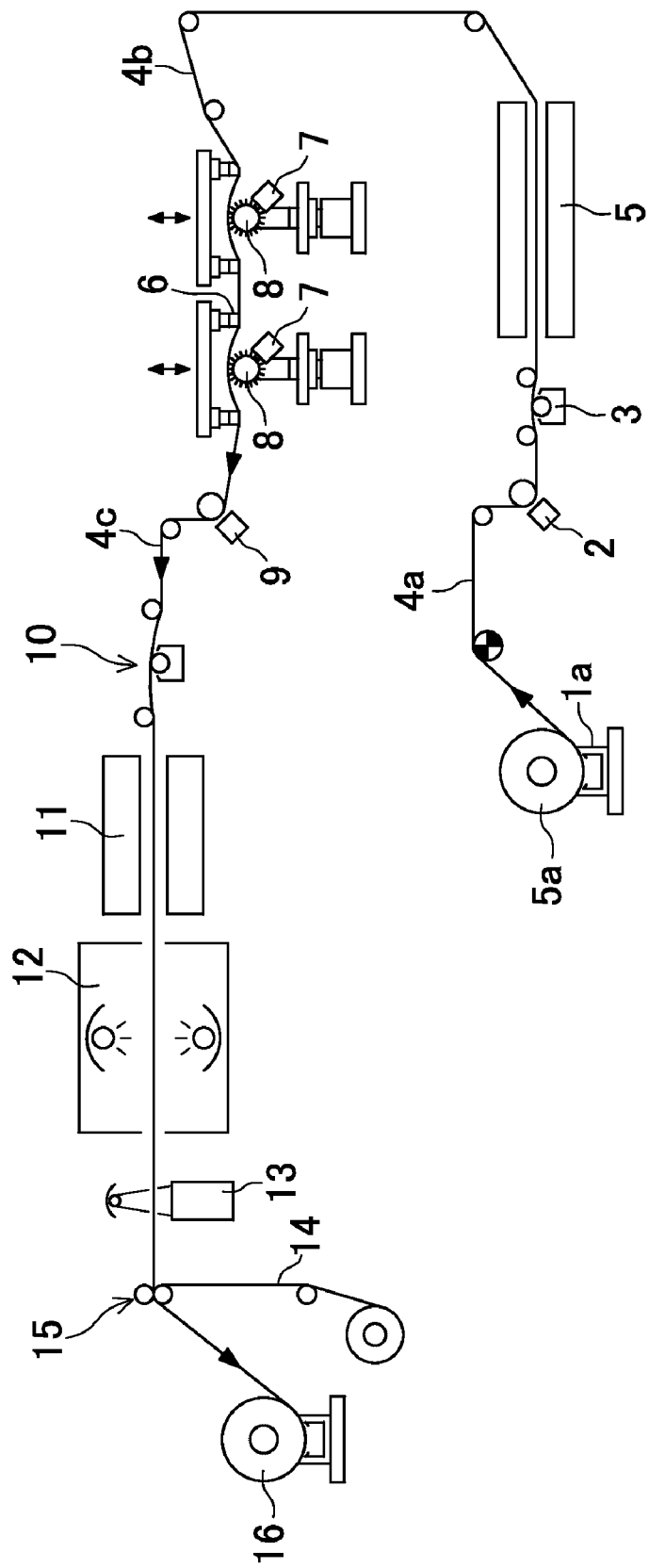
FIG. 1 is a schematic diagram showing one example of the apparatus for producing an optical compensation film of the present invention.

FIG. 1 shows a schematic diagram of an apparatus for producing an optical compensation film of the present invention. A transparent substrate 4a, which has been fed from a long roll of the film (film roll) 5a via a feeder 1a, is transported via a drive roller. After removal of dust by a surface-dust remover 2, a coating solution containing a resin for forming an alignment layer is applied to the transparent substrate 4a by a coater 3, and the coating solution is dried in a drying zone 5, resulting in an alignment layer being formed on the surface of the film.

The transparent substrate 4b on which the alignment layer has been formed is subjected to rubbing treatment by a rubbing apparatus having rubbing rollers 8, guide rollers 6 secured to the roller stage via springs, and dust removers 7 attached to the rubbing rollers. Dust on the surface of the alignment layer is removed by a surface-dust remover 9 disposed adjacent to the rubbing apparatus. A known rubbing apparatus other than that described above may also be used. The transparent substrate 4c after the rubbing treatment is transported via drive rollers, and a liquid crystal layer coating solution containing a liquid crystal compound is applied to the alignment layer by a coater 10 (a liquid crystal layer application step). Next, the solvent in the liquid crystal layer coating solution is dried by heating in a drying zone 11 (a liquid crystal layer drying step), and the transparent substrate 4c is passed through an ultraviolet radiation apparatus 12. Here, when the surface of the transparent substrate 4c after being cooled is irradiated with ultraviolet rays, the liquid crystal layer is cured by cross-linking, thereby forming an optically anisotropic layer (a cooling and curing step). After this, the transparent substrate 4c is heated and irradiated with ultraviolet rays, causing the alignment layer to be cured by the isomerization reaction of the compound in the alignment layer that undergoes photoisomerization upon exposure to ultraviolet rays (a heating and curing step).

After the alignment layer and liquid crystal layer have been cured, the transparent substrate is subjected to measurement of the optical characteristics of its surface by an inspection apparatus 13, and is inspected for any abnormalities. A protective film 14 is subsequently laminated to the surface of the optically anisotropic layer by a laminator 15, after which the optical compensation film is wound up by a winder 16.

Alternatively, the transparent substrate 4b on which the alignment layer has been formed by applying a resin for forming an alignment layer, and then drying the resin, can be wound up; and, using this wound-up film, integrated production can be carried out by continuously performing the steps from preparing an optical compensation film to winding up the resulting film. In this case, the transparent substrate 4b on which an alignment layer has been formed is fed from the film roll via the feeder, and the steps after the rubbing step are performed using the same apparatuses as those shown in FIG. 1.

Feeders that are generally used for feeding plastic films may be used as the feeders for use when feeding the transparent substrate 4a and when feeding the transparent substrate 4b having an alignment layer. Specifically, feeders disclosed in Japanese Patent Application Laid-Open No. 9-73081 can be used.

The step of applying a resin for forming an alignment layer to the transparent substrate, the step of drying the resin for forming an alignment layer, the step of subjecting the transparent substrate on which the alignment layer has been formed to rubbing treatment, and the step of removing dust from the surface of the alignment layer can also be performed using the processes and apparatuses disclosed in Japanese Patent Application Laid-Open No. 9-73081.

Figure 2:
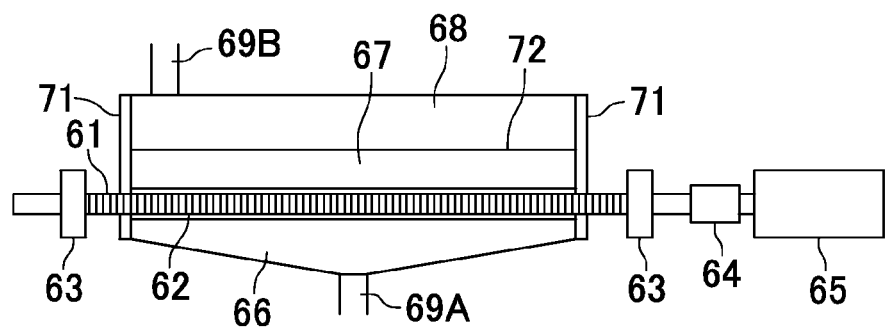
FIG. 2 is a diagram showing a plan view of one example of a wire bar coating apparatus usable in the apparatus of the present invention.
Figure 3:
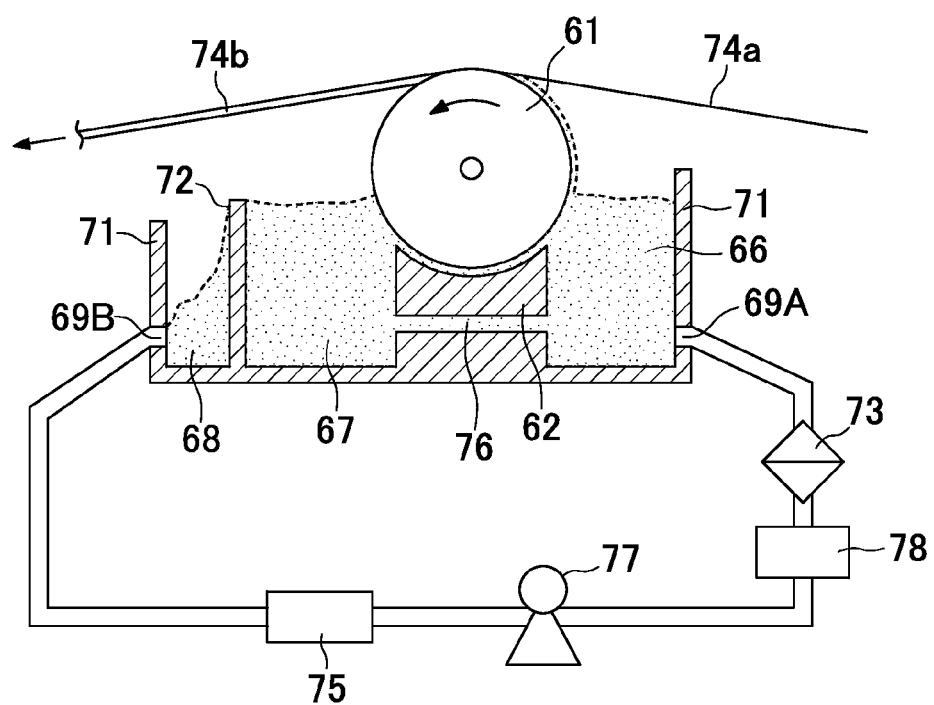
FIG. 3 is a diagram showing a cross section of one example of a wire bar coating apparatus usable in the apparatus of the present invention.

The liquid crystal layer application step of applying a liquid crystal layer coating solution containing a liquid crystal compound to the alignment layer is now described in detail, referring to FIGS. 2 and 3. Although the step is described herein using a wire bar coating apparatus as an example, the coating apparatus is not limited to the wire bar coating apparatus, and various types of coating apparatuses can be used. FIG. 2 is a plan view of a wire bar coating apparatus, and FIG. 3 is a cross section of the wire bar coating apparatus. A wire bar 61 is supported by bearings 63 on both ends thereof, and a portion of the wire bar 61 present between the bearings 63 is supported on a backup 62. An end of the bar is connected to a motor 65 via a coupling 64. The liquid crystal layer coating solution is fed via a solution inlet 69A, passes through a primary-side solution reservoir 66 and then a connecting pipe 76, filling a secondary-side solution reservoir 67. The surface of the solution in each of the primary-side solution reservoir 66 and secondary-side solution reservoir 67 is regulated by a solution-surface regulating plate 72, and overflow solution is discharged via a solution outlet 69B by way of an overflow solution reservoir 68. The discharged coating solution is adjusted to an appropriate viscosity in a viscosity adjusting chamber 75 by adding the coating solution, or, if necessary, by adding the solvent. The coating solution is then filtered through a filter 73 while being pumped through a pump 77, and the filtered coating solution is subsequently fed to the solution inlet 69A again. A densimeter is disposed prior to the filter 73, allowing the viscosity to be adjusted based on the information from the densimeter. Coating is performed by contacting the wire bar 61 with the surface of the alignment layer of a film 74a that has the alignment layer and is being transported, or by contacting the wire bar 61 with the surface of the alignment layer of the film 74a via the coating solution. The wire bar 61 is typically composed of a rod with a diameter of 5 to 20 mm, and a wire with a diameter of 20 to 150 μm that is tightly wound around the rod. Coating is performed by rotating the wire bar 61 in the same direction as the transport direction of the film 74a at substantially the same speed as the transport speed, and by contacting the film 74a with the coating solution drawn from the primary-side solution reservoir 66.

Figure 4:
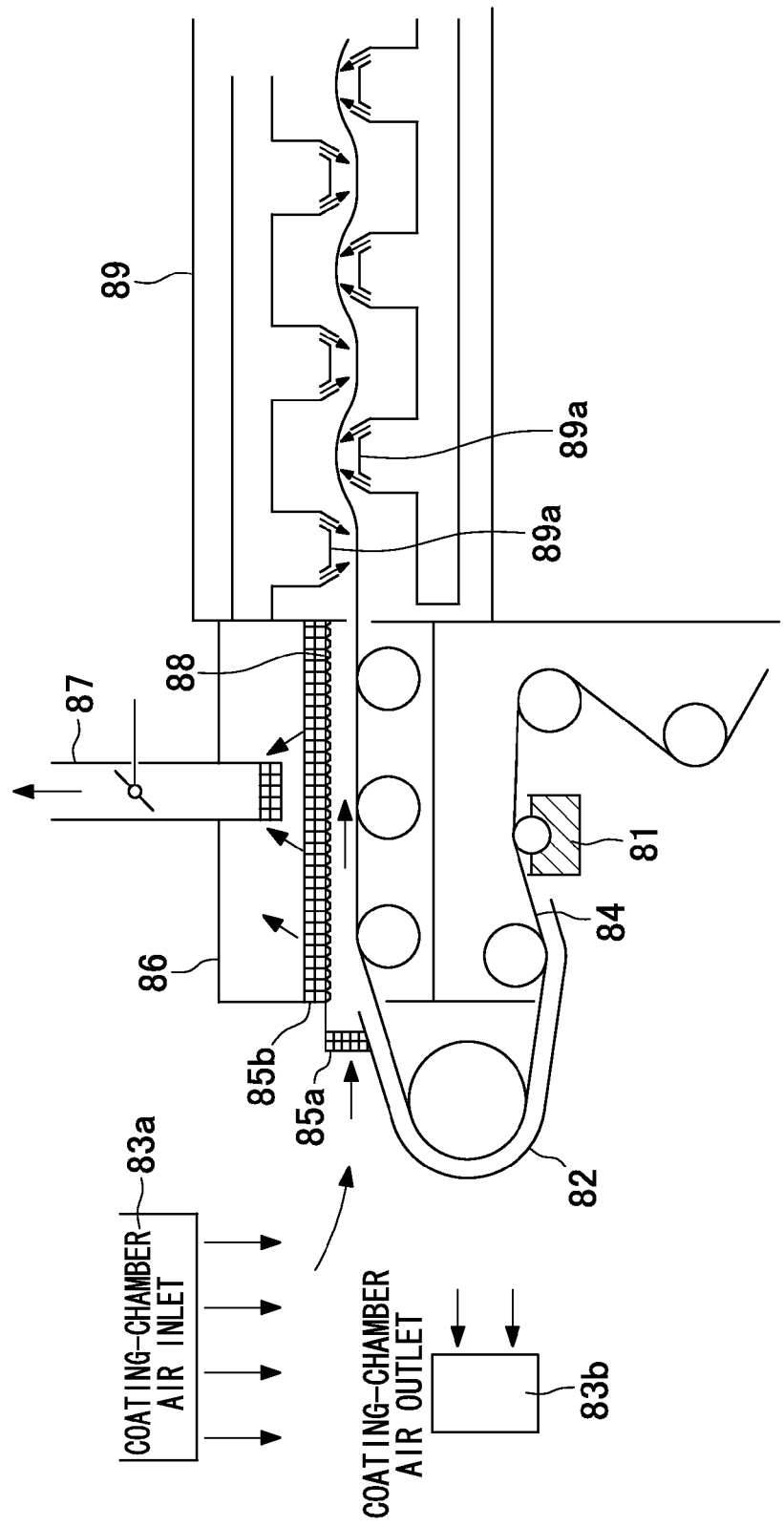
FIG. 4 is a diagram showing one example of an apparatus for drying the liquid crystal layer usable in the apparatus of the present invention.

The liquid crystal layer drying step of drying the liquid crystal layer to evaporate the solvent in the liquid crystal layer is now described in detail, referring to FIG. 4. Note that the drying apparatus is not also limited to that shown in FIG. 4, and various types of drying apparatuses can be used. A transparent substrate 84 having a liquid crystal layer that has been applied by a coater 81 is transported along a rectifying plate 82 to a drying zone 86, and then to a heating zone 89. A period of several seconds to several minutes immediately after the application corresponds to a constant-rate drying period, in which a decrease in the amount of solvent contained in the liquid crystal layer is proportional to the time ("*Kagaku Kogaku* Dictionary" ["Chemical Engineering Dictionary"], pp. 707-712, published by Maruzen, Co., Ltd., Oct. 25, 1980). If the liquid crystal layer is unevenly exposed to air or heat during this period, the film thickness of the layer will become uneven, causing non-uniformity in the alignment of the optically anisotropic layer that is finally obtained. Therefore, it is preferable that a minimum amount of air be applied to the liquid crystal layer during the period of time from immediately after the application to the entry into the heating zone 89. Thus, air is introduced from a coating-chamber air inlet 83a via a wire gauze 85a in the drying zone 86 subsequent to the rectifying plate (the force and direction of the air are substantially the same as the transport speed and direction, respectively, of the film). The air from the coating-chamber air inlet 83a is discharged via a coating-chamber air outlet 83b, and is also discharged via an exhaust opening 87 from a wire gauze 85a by way of a porous plate 88 and a wire gauze 85b. A gap between the rectifying plate and the film is typically 1 to 50 mm. The rectifying plate preferably has a length of 1 to 10 m. The temperature in the drying zone 86 is preferably from room temperature to 50° C. The air introduced to the drying zone 86 typically has a velocity of 0.01 to 0.6 m/second. After drying at a low temperature in the drying zone 86, the drying temperature is elevated in the heating zone 89, and then drying is performed. If heat-drying is performed from the coated-surface side, the surface of the liquid crystal layer is dried first. This causes liquid crystal molecules on the surface to align without undergoing the alignment control by the alignment layer, resulting in non-uniformity in the alignment of the liquid crystal molecules in the liquid crystal layer as a whole. To prevent this, the heating zone 89 may be configured to apply hot air via hot-air jets 89a disposed on both sides of the transparent substrate, allowing the hot air to be applied to both sides of the transparent substrate. Alternatively, the heating zone 89 may be configured to apply air from the coated-surface side or from a rear-surface side only. The heating temperature is preferably adjusted such that the temperature of the liquid crystal layer is 120° C. or more and 140° C. or less.

Figure 5:
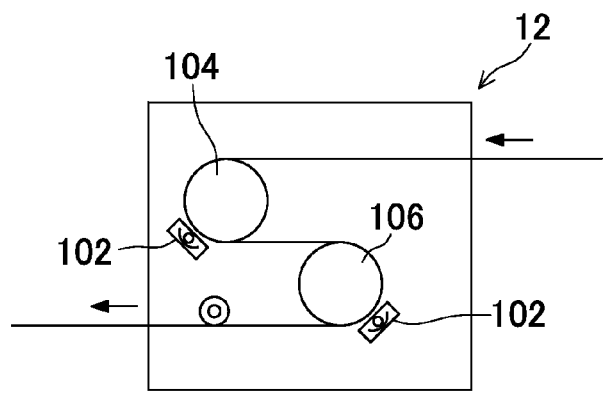
FIG. 5 is a diagram showing one example of an ultraviolet radiation apparatus usable in the apparatus of the present invention.

The thus-obtained transparent substrate having the alignment layer and liquid crystal layer is transported to an ultraviolet radiation apparatus 12, which is a curing apparatus, where the alignment layer and liquid crystal layer are irradiated with ultraviolet rays. As shown in FIG. 5, the ultraviolet radiation apparatus 12 includes, for example, ultraviolet lamps 102; a cooling roll 104 capable of adjusting the temperature, i.e., a cooling apparatus; and a heating roll 106 capable of adjusting the temperature, i.e., a heating apparatus.

A transparent substrate transported into the ultraviolet radiation apparatus 12 passes through the ultraviolet lamp 102 disposed on the cooling roll 104, while it is fixed around the roll. Because the transparent substrate has a lowered temperature by being cooled by the cooling roll 104, only the liquid crystal compound of the liquid crystal layer having a cross-linkable functional group is cross-linked and cured, thereby forming an optically anisotropic layer.

Next, the transparent substrate passes through the ultraviolet lamp 102 disposed on the heating roll 106, while it is fixed around the roll. Because the transparent substrate has been heated by the heating roll 106, the compound in the alignment layer that undergoes photoisomerization upon exposure to ultraviolet rays is cured by the isomerization reaction. Further, because the liquid crystal layer (the optically anisotropic layer) has been cured by the ultraviolet lamp 102 on the cooling roll 104, an optical compensation film can be produced without impairment of the optical compensation function due to the ultraviolet radiation on the heating roll 106.

With respect to the temperatures of the alignment layer and liquid crystal layer in the ultraviolet radiation apparatus 12, the temperature of the liquid crystal layer on the cooling roll 104 for curing the liquid crystal layer is preferably 40° C. or more and 100° C. or less. By adjusting the temperature within this range, it is possible to produce a film having improved durability and damage resistance, without impairment of the optical compensation function. Moreover, the liquid crystal layer can be completely cured in the subsequent heating and curing step on the heating roll 106. The temperature of the alignment layer on the heating roll 106 for curing the alignment layer is preferably 100° C. or more and 135° C. or less. Because the alignment layer is less easily cured than the liquid crystal layer, it is preferably cured at a temperature of 100° C. or more. By curing the alignment layer at 100° C. or more, the durability and damage resistance can also be improved. However, a curing temperature higher than 135° C. may exceed the glass transition temperature (Tg) of the transparent substrate; in this case, flatness of the transparent substrate cannot be maintained, resulting in impaired flatness of the optical compensation film itself.

Figure 6:
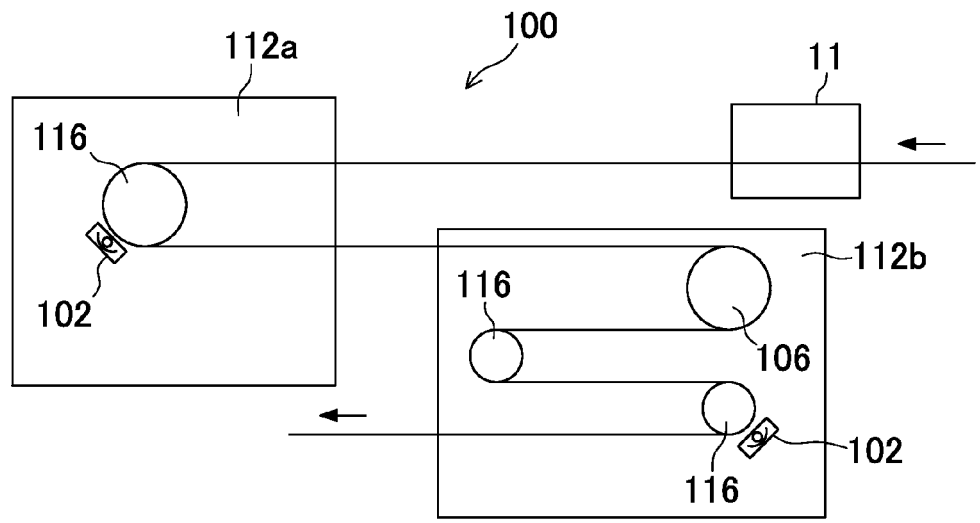
FIG. 6 is a diagram showing another example of an ultraviolet radiation apparatus usable in the apparatus of the present invention.

FIG. 6 shows another embodiment of the ultraviolet radiation apparatus. The ultraviolet radiation apparatus 100 shown in FIG. 6 includes separate zones 112a and 112b. The zone 112a located upstream in the transport direction of a transparent substrate is a cooling zone, and the zone 112b located downstream is a heating zone. The cooling zone is a zone for lowering the temperature of the transparent substrate that has passed a drying zone 11. The cooling zone lowers the temperature of the transparent substrate by cooling the cooling zone to preferably 25° C. to 110° C. Similarly, the heating zone increases the temperature of the transparent substrate by heating the heating zone. The cooling zone can be cooled by, for example, a method wherein cooling air is supplied; and the heating zone can be heated by, for example, a method wherein hot air is supplied. The ultraviolet radiation apparatus 100 is now described using cooling air and hot air as an example.

The transparent substrate from which the solvent in the liquid crystal layer coating solution has been removed in the drying zone 11 is transported to the cooling zone 112a in the ultraviolet radiation apparatus 100. The temperature of the cooling zone 112a has been adjusted to a predetermined temperature using cooling air that is supplied via cooling-air jets (not shown). In the cooling zone 112a, the liquid crystal layer is cooled, and then cured by ultraviolet radiation from an ultraviolet lamp 102. Although a general roller 106 is used in FIG. 6, a cooling roll may be used instead of the roller 106, if the transparent substrate cannot be sufficiently cooled by using cooling air only.

Next, the transparent substrate that has passed the cooling zone 112a is transported to the heating zone 112b. The temperature of the heating zone 112b has been adjusted using hot air supplied via hot-air jets (not shown). In the heating zone 112b, the alignment layer is heated, and thus, can maintain a predetermined temperature in the heating zone 112b. In FIG. 6, the temperature is also controlled by the heating roll 106. The thus-heated transparent substrate that maintains a predetermined temperature is irradiated with ultraviolet rays by an ultraviolet lamp 102, whereby the alignment layer is cured.

By controlling the temperature of each zone using cooling air or hot air, it is possible to perform curing at a constant temperature, thereby producing an optical film having a high quality.

Figure 7:
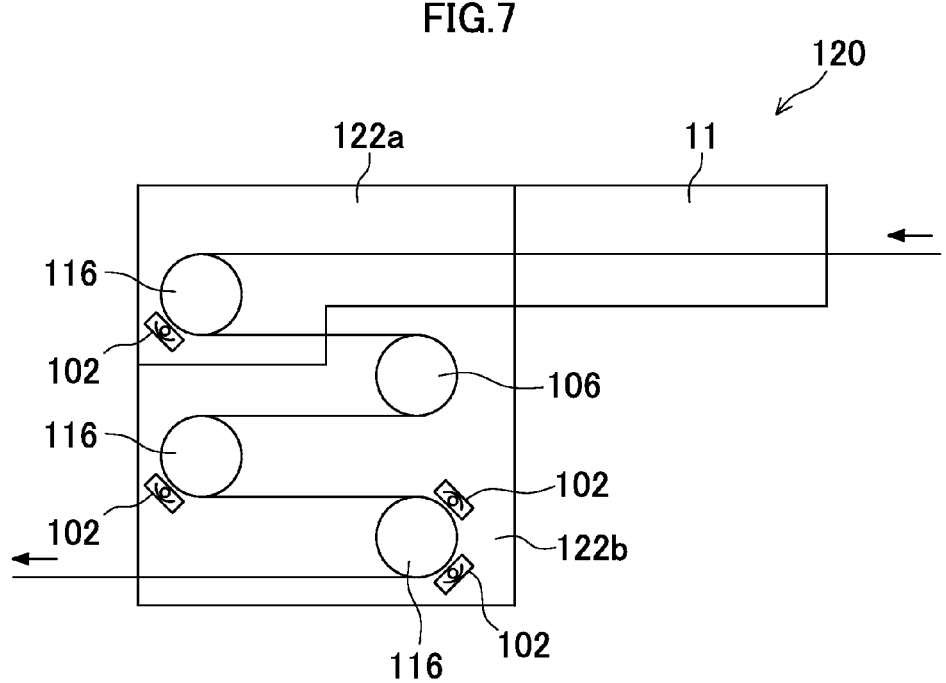
FIG. 7 is a diagram showing still another example of an ultraviolet radiation apparatus usable in the apparatus of the present invention.

FIG. 7 shows still another embodiment of the ultraviolet radiation apparatus. The ultraviolet radiation apparatus 120 shown in FIG. 7 differs from the ultraviolet radiation apparatus 100 shown in FIG. 6 in that a drying zone 11, zone 122a, and zone 122b are separated by partitions. Reference numeral 122a designates a cooling zone, and reference numeral 122b designates a heating zone. In the cooling zone 122a, the temperature is adjusted using cooling air, and the liquid crystal layer is cured by an ultraviolet lamp 102. In the heating zone 122b, the temperature is adjusted using hot air, and the alignment layer is heated. In FIG. 7, the heating roller 106 is the first roller in the heating zone 122a, and the other rollers are transport rollers 116; however, this structure can be modified as desired according to the temperature conditions, as with the ultraviolet radiation apparatus shown in FIG. 6.

Figure 8:
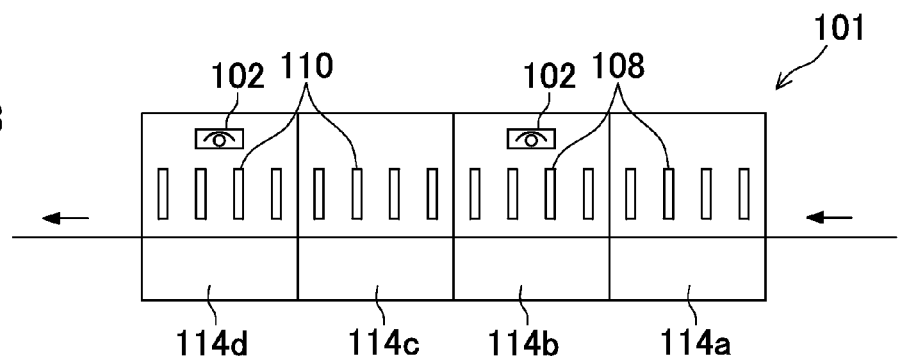
FIG. 8 is a diagram showing still another example of an ultraviolet radiation apparatus usable in the apparatus of the present invention.

FIG. 8 shows still another embodiment of the ultraviolet radiation apparatus. The ultraviolet radiation apparatus 101 shown in FIG. 8 includes cooling-air jets 108 for blowing cooling air as a cooling apparatus, and hot-air jets 110 for blowing hot air as a heating apparatus. The ultraviolet radiation apparatus 101 also has air outlets not shown in the figure, which are provided opposite the cooling-air jets 108 and hot-air jets 110, with a transparent substrate present between the air outlets, and the cooling-air jets 108 and hot-air jets 110. Because the ultraviolet radiation apparatus 101 is thus separated into four zones, i.e., 114a, 114b, 114c, and 114d, the transparent substrate can be cooled in the zone 114a such that the temperature of the substrate becomes constant, and, in the subsequent zone 114b, curing can be performed by an ultraviolet lamp 102 while maintaining the temperature. Similarly in the zones 114c and 114d, the transparent substrate can be heated in the zone 114c such that the temperature of the substrate becomes constant, and subsequently in the zone 114d, curing can be performed while maintaining the temperature. Therefore, curing can be performed at precise and stable temperatures.

Figure 9:
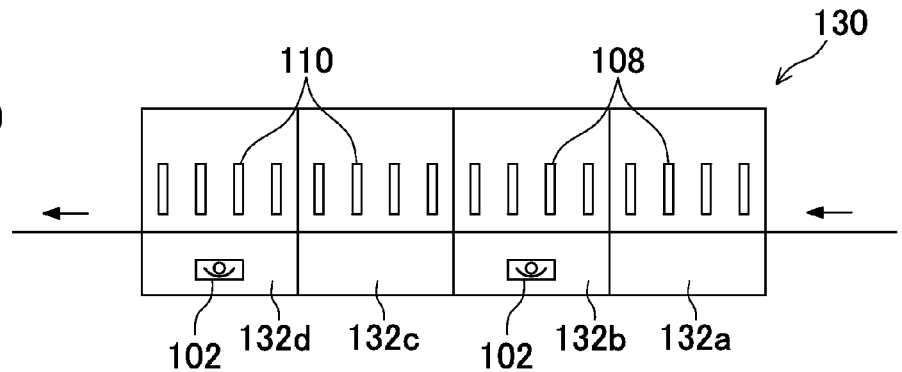
FIG. 9 is a diagram showing still another example of an ultraviolet radiation apparatus usable in the apparatus of the present invention.

FIG. 9 shows still another embodiment of the ultraviolet radiation apparatus. The ultraviolet radiation apparatus 130 shown in FIG. 9 differs from that shown in FIG. 8 in that ultraviolet lamps 102 are provided opposite the coated surface. The apparatus of FIG. 9 enables the liquid crystal layer and alignment layer to be cured even when ultraviolet radiation is emitted from opposite the coated surface.

Although the slit-like jets are used as cooling-air jets and hot-air jets in FIGS. 8 and 9, the cooling-air and hot-air jets are not limited thereto; for example, nozzle-type jets may also be used. Moreover, although the ultraviolet radiation apparatus is separated into four zones using partitions in FIGS. 8 and 9, the number of the zones is not particularly limited. Further, the ultraviolet radiation apparatus may also be separated into zones in the form of boxes, rather than using partitions.

The thus-formed optical compensation film is subjected to measurement of optical characteristics using an inspection apparatus 13, and inspected for any abnormalities. A protective film 14 is subsequently laminated to the surface of the optically anisotropic layer by a laminator 15, after which the optical compensation film is wound up by a winder.

Next, materials used in the process and apparatus for producing an optical compensation film of the present invention will be described.

[Transparent Substrate]

In the apparatus according to this embodiment, a transparent substrate is used. The transparent substrate herein means a substrate having a light transmittance of 80% or more. The transparent substrate preferably has a smaller wavelength dispersion; specifically, it preferably has an Re 400/Re 700 ratio of less than 1.2. The transparent substrate also preferably has lower optical anisotropy; specifically, it preferably has an in-plane retardation (Re) of 20 nm or less, and more preferably 10 nm or less. Further, the transparent substrate preferably undergoes an in-plane retardation change of 20 nm or less, and more preferably 10 nm or less, due to an environmental change.

A polymer film is preferable as the transparent substrate. Examples of polymers include cellulose esters, polycarbonates, polysulfones, polyethersulfones, polyacrylates, and polymethacrylates. Cellulose esters are preferable, cellulose acetate is more preferable, and cellulose triacetate is the most preferable. In particular, when cellulose triacetate is used, it preferably has an acetylation degree of 60.25 to 61.50. A polymer film is preferably formed by solvent casting.

It is preferable that a substrate in the form of a long roll be used as the substrate, and an optically anisotropic layer be continuously applied to the substrate. The substrate can be cut into a desirable size after forming the optically anisotropic layer. The transparent substrate preferably has a thickness of 20 to 500 µm, and more preferably 40 to 200 µm. Further, in order to improve the adhesion between the transparent substrate and the layer formed thereon (an adhesive layer, a horizontal alignment layer, a vertical alignment layer, or an optically anisotropic layer), the transparent substrate may be subjected to a surface treatment (for example, glow discharge treatment, corona discharge treatment, ultraviolet (UV) treatment, flame treatment, or saponification treatment), or an adhesive layer (an undercoat layer) may be formed on the transparent substrate. Saponification treatment is preferable as the surface treatment.

[Alignment Layer]

An alignment layer is preferably used to align the liquid crystal compound. An alignment layer can be obtained by, for example, subjecting an organic compound (preferably a polymer) to rubbing treatment; oblique vapor deposition of an inorganic compound; forming a layer having microgroups; or depositing an organic compound (for example, co-tricosenoic acid, dioctadecyl dimethyl ammonium chloride, or methyl stearate) using the Langmuir-Blodgett method (an LB film). An alignment layer to which an alignment function has been imparted by application of an electric field, application of a magnetic field, or light radiation is also known. An alignment layer formed by subjecting a polymer to rubbing treatment is particularly preferable. Rubbing treatment is performed by rubbing the surface of a polymer layer several times along a certain direction, using paper or a cloth.

The type of the polymer used as the alignment layer is determined according to the alignment (in particular, an average tilted angle) of the liquid crystal compound. In order to horizontally align the liquid crystal compound, a polymer that will not lower the surface energy of the alignment layer (a general polymer for alignment) is used. Specific types of such polymers are disclosed in various documents concerning liquid crystal cells or optical compensation sheets. In the present invention, a polymer having a polymerizable group is used as the alignment layer, in order to improve the adhesion between the optically anisotropic layer formed of the liquid crystal compound and the transparent substrate (the alignment layer). A polymerizable group can be introduced by introducing a repeating unit having a polymerizable group to a side chain, or by introducing a polymerizable group as a substituent of a cyclic group. It is more preferable to use an alignment layer that forms a chemical bond with the liquid crystal compound at the interface. An example of such an alignment layer is that disclosed in Japanese Patent Application Laid-Open No. 9-152509. The alignment layer preferably has a thickness of 0.01 to 5 μm, and more preferably 0.05 to 1 μm.

[Liquid Crystal Compound]

A photocurable liquid crystal compound is used to form the optically anisotropic layer. A photocurable rod-like liquid crystal compound or photocurable discotic liquid crystal compound having a polymerizable group is preferable as the photocurable liquid crystal compound. A photocurable rod-like liquid crystal compound is used for forming at least one optically anisotropic layer (preferably the optically anisotropic layer adjacent to the alignment layer). Examples of rod-like liquid crystal compounds that are preferably used include azomethines, azoxys, cyanobiphenyls, cyanophenyl esters, benzoates, cyclohexane carboxylic acid phenyl esters, cyanophenyl cyclohexanes, cyano-substituted phenyl pyrimidines, alkoxy-substituted phenyl pyrimidines, phenyl dioxanes, tolans, and alkenyl cyclohexyl benzonitriles. In addition to these low-molecular-weight liquid crystal molecules, polymeric liquid crystal molecules can also be used. Particularly preferable as polymeric liquid crystal molecules are those wherein rod-like liquid crystals are attached to polymer chains in the form of a pendant. These polymeric liquid crystal molecules are herein included within the scope of rod-like liquid crystal compounds.

Examples of low-molecular-weight photocurable rod-like liquid crystal compounds (hereinafter also referred to as "polymerizable rod-like liquid crystal compounds") that are particularly preferably used include compounds represented by the following Formula (I):

$$Q^1\text{-}L^1\text{-}Cy^1\text{-}L^2\text{-}(Cy^2\text{-}L^3)_n\text{-}Cy^3\text{-}L^4\text{-}Q^2 \quad \text{Formula (I)}$$

wherein $Q^1$ and $Q^2$ each independently represent a polymerizable group; $L^1$ and $L^4$ are each independently a divalent linker group; $L^2$ and $L^3$ are each independently a single bond or a divalent linker group; $Cy^1$, $Cy^2$, and $Cy^3$ are each independently a divalent cyclic group; and n is 0, 1, or 2.

Polymerizable rod-like liquid crystal compounds will be described below in more detail. In Formula (I), $Q^1$ and $Q^2$ are each independently a polymerizable group. The polymerization reaction of the polymerizable group is preferably addition polymerization (including ring-opening polymerization) or condensation polymerization. In other words, the polymerizable group is preferably a functional group capable of undergoing an addition-polymerization reaction or condensation-polymerization reaction. Examples of the polymerizable group are as follows.

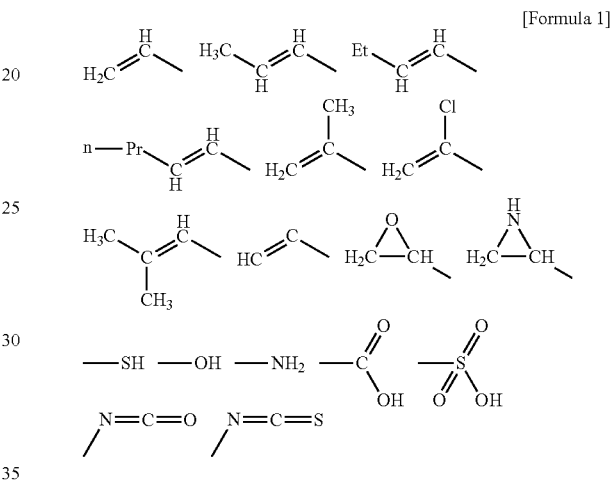

[Formula 1]

In Formula (I) above, $L^1$ and $L^4$ are each independently a divalent linker group. Preferably, $L^1$ and $L^4$ are each independently a divalent linker group selected from the group consisting of —O—, —S—, —CO—, —NR$^2$—, a divalent acyclic group, a divalent cyclic group, and combinations thereof. $R^2$ above is an alkyl group having 1 to 7 carbon atoms or a hydrogen atom.

Examples of combinations of divalent linker groups are shown below. In the following examples, the left end is attached to Q ($Q^1$ or $Q^2$), and the right end is attached to Cy ($Cy^1$ or $Cy^3$).

L-1: —CO—O-divalent acyclic group-O—;
L-2: —CO—O-divalent acyclic group-O—CO—;
L-3: —CO—O-divalent acyclic group-O—CO—O—;
L-4: —CO—O-divalent acyclic group-O-divalent cyclic group-;
L-5: —CO—O-divalent acyclic group-O-divalent cyclic group-CO—O—;
L-6: —CO—O-divalent acyclic group-O-divalent cyclic group-O—CO—;
L-7: —CO—O-divalent acyclic group-O-divalent cyclic group-divalent acyclic group-;
L-8: —CO—O-divalent acyclic group-O-divalent cyclic group-divalent acyclic group-CO—O—;
L-9: —CO—O-divalent acyclic group-O-divalent cyclic group-divalent acyclic group-O—CO—;
L-10: —CO—O-divalent acyclic group-O—CO-divalent cyclic group-;
L-11: —CO—O-divalent acyclic group-O—CO-divalent cyclic group-CO—O—;
L-12: —CO—O-divalent acyclic group-O—CO-divalent cyclic group-O—CO—;

L-13: —CO—O-divalent acyclic group-O—CO-divalent cyclic group-divalent acyclic group-;
L-14: —CO—O-divalent acyclic group-O—CO-divalent cyclic group-divalent acyclic group-CO—O—;
L-15: —CO—O-divalent acyclic group-O—CO-divalent cyclic group-divalent acyclic group-O—CO—;
L-16: —CO—O-divalent acyclic group-O—CO—O-divalent cyclic group-;
L-17: —CO—O-divalent acyclic group-O—CO—O-divalent cyclic group-CO—O—;
L-18: —CO—O-divalent acyclic group-O—CO—O-divalent cyclic group-O—CO—;
L-19: —CO—O-divalent acyclic group-O—CO—O-divalent cyclic group-divalent acyclic group-;
L-20: —CO—O-divalent acyclic group-O—CO—O-divalent cyclic group-divalent acyclic group-CO—O—; and
L-21: —CO—O-divalent acyclic group-O—CO—O-divalent cyclic group-divalent acyclic group-O—CO—; wherein the divalent acyclic group means an alkylene, substituted alkylene, alkenylene, substituted alkenylene, alkynylene, or substituted alkynylene group. Alkylene, substituted alkylene, alkenylene, and substituted alkenylene groups are preferable, and alkylene and alkenylene groups are more preferable. The alkylene group may be branched. The alkylene group preferably has 1 to 12 carbon atoms, more preferably 2 to 10 carbon atoms, and most preferably 2 to 8 carbon atoms. The alkylene portion of the substituted alkylene group is the same as the above-defined alkylene group. Examples of substituents include halogen atoms. The alkenylene group may be a branched chain. The alkenylene group preferably has 2 to 12 carbon atoms, more preferably 2 to 10 carbon atoms, and most preferably 2 to 8 carbon atoms. The alkylene portion of the substituted alkylene group is the same as the above-defined alkylene group. Examples of substituents include halogen atoms. The alkynylene group may be a branched chain. The alkynylene group preferably has 2 to 12 carbon atoms, more preferably 2 to 10 carbon atoms, and most preferably 2 to 8 carbon atoms. The alkynylene portion of the substituted alkynylene group is the same as the above-defined alkynylene group. Examples of substituents include halogen atoms. Specific examples of the divalent acyclic group include ethylene, trimethylene, propylene, butamethylene, 1-methyl-butamethylene, pentamethylene, hexamethylene, octamethylene, 2-butenylene, and 2-butynylene.

The definition and examples of the divalent cyclic group are the same as those of $Cy^1$, $Cy^2$, and $Cy^3$ described below. $R^2$ is preferably an alkyl group having 1 to 4 carbon atoms or a hydrogen atom; more preferably a methyl group, an ethyl group, or a hydrogen atom; and most preferably a hydrogen atom.

$L^2$ or $L^3$ is each independently a single bond or a divalent linker group. Preferably, $L^2$ and $L^3$ are each independently a divalent linker group or a single bond selected from the group consisting of —O—, —S—, —CO—, —$NR^2$—, a divalent acyclic group, a divalent cyclic group, and combinations thereof. $R^2$ above is an alkyl group having 1 to 7 carbon atoms or a hydrogen atom; preferably an alkyl group having 1 to 4 carbon atoms or a hydrogen atom; more preferably a methyl group, an ethyl group, or a hydrogen atom; and most preferably a hydrogen atom. The definitions of the divalent acyclic group and divalent cyclic group are the same as those of $L^1$ and $L^4$.

In Formula (I), n is 0, 1, or 2. Where n is 2, two $L^3$ may be the same or different, and two $Cy^2$ may be the same or different. Preferably, n is 1 or 2, and more preferably 1.

In Formula (I), $Cy^1$, $Cy^2$, and $Cy^3$ are each independently a divalent cyclic group. The ring contained in the cyclic group is preferably a 5-membered-ring, 6-membered-ring, or 7-membered-ring, more preferably a 5-membered-ring or 6-membered ring, and most preferably a 6-membered ring. The ring contained in the cyclic group may be a fused ring. However, a monocyclic ring is preferred to a fused ring. The ring contained in the cyclic group may be any of an aromatic ring, aliphatic ring, and heterocyclic ring. Examples of aromatic rings include benzene and naphthalene. Examples of aliphatic rings include cyclohexane. Examples of heterocyclic rings include pyridine and pyrimidine. 1,4-phenylene is preferable as a cyclic group having a benzene ring. Naphthalene-1,5-diyl and naphthalene-2,6-diyl are preferable as cyclic groups having a naphthalene ring. 1,4-cyclohexylene is preferable as a cyclic group having a cyclohexane ring. Pyridine-2,5-diyl is preferable as a cyclic group having a pyridine ring. Pyrimidine-2,5-diyl is preferable as a cyclic group having a pyrimidine ring.

The cyclic group may have a substituent. Examples of substituents include halogen atoms, cyano groups, nitro groups, alkyl groups having 1 to 5 carbon atoms, halogen-substituted alkyl groups having 1 to 5 carbon atoms, alkoxy groups having 1 to 5 carbon atoms, alkylthio groups having 1 to 5 carbon atoms, acyloxy groups having 2 to 6 carbon atoms, alkoxycarbonyl groups having 2 to 6 carbon atoms, carbamoyl groups, alkyl-substituted carbamoyl groups having 2 to 6 carbon atoms, and acylamino groups having 2 to 6 carbon atoms.

Specific examples of photocurable rod-like liquid crystal compounds usable in the present invention are shown below; however, the present invention is not limited to these examples.

[Formula 2]

I-1)

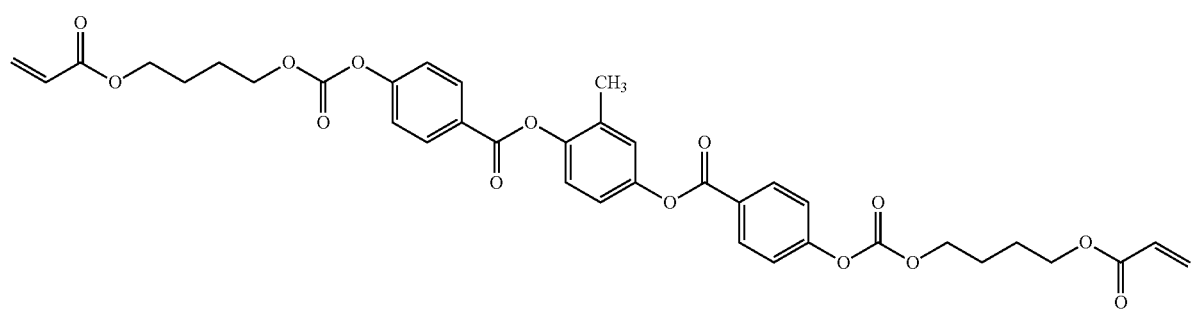

-continued
I-2)
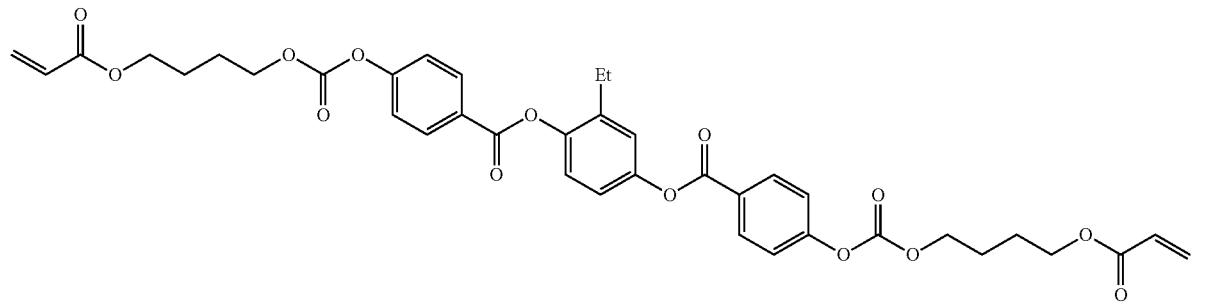
I-3)
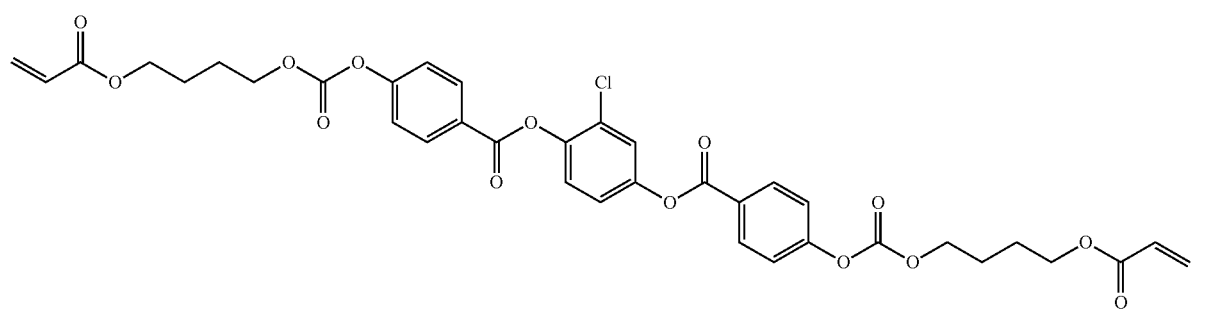
I-4)
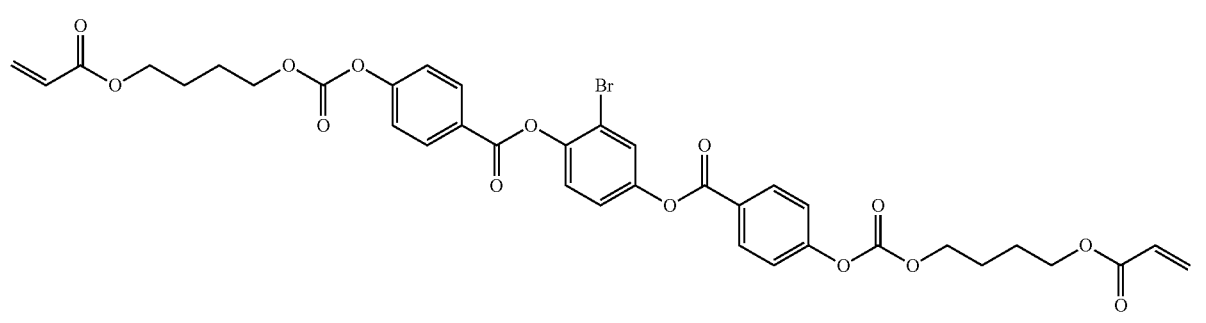
I-5)
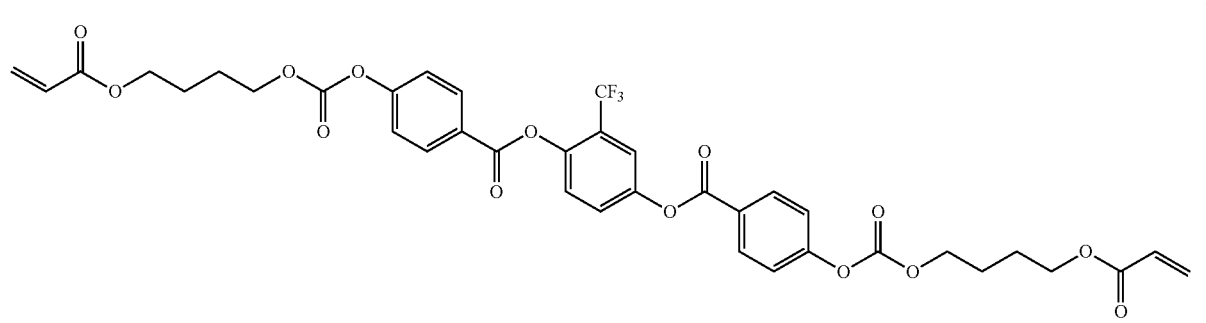
I-6)
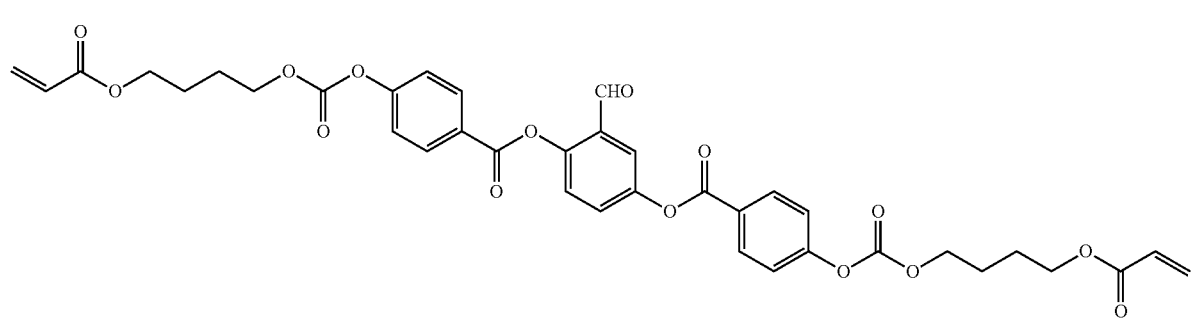

[Formula 3]
I-7)
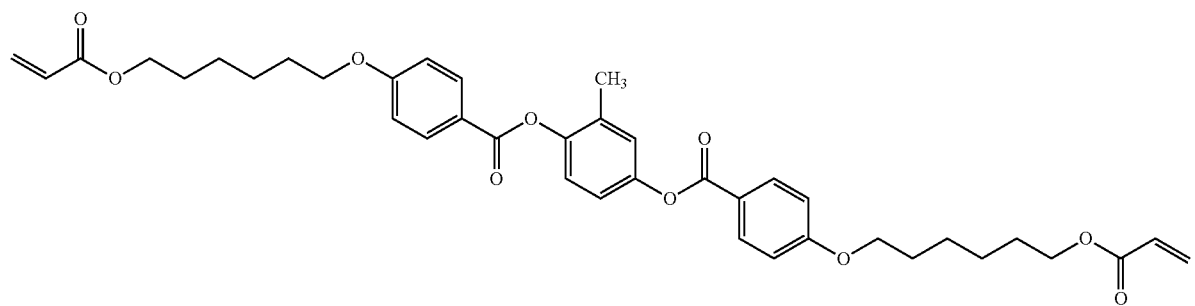
I-8)
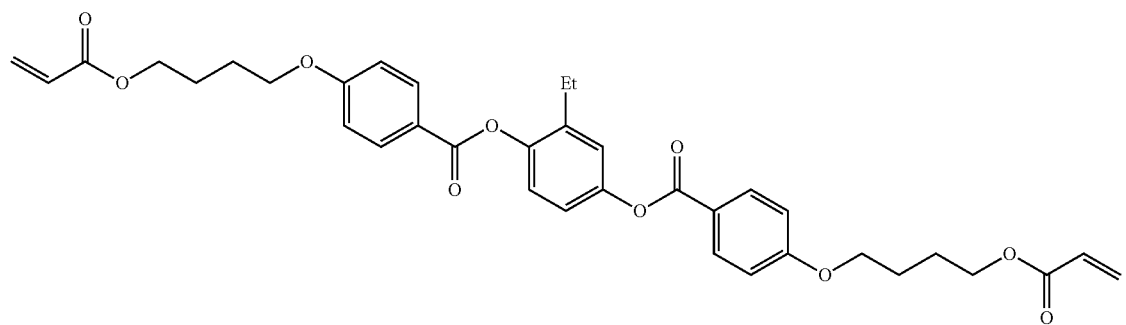
I-9)
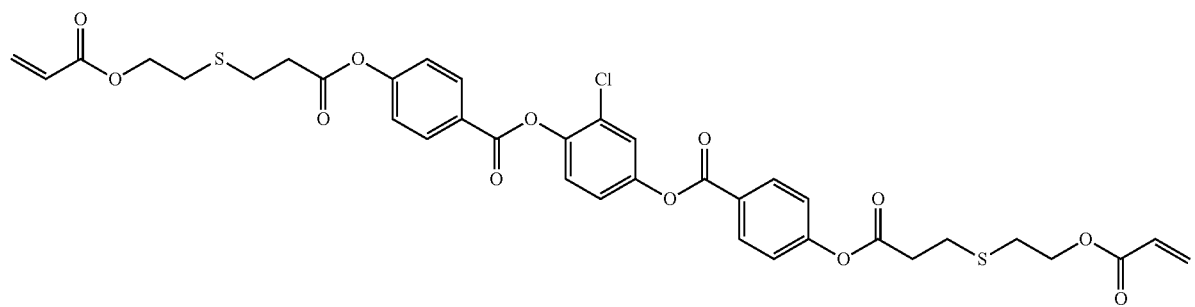
I-10)
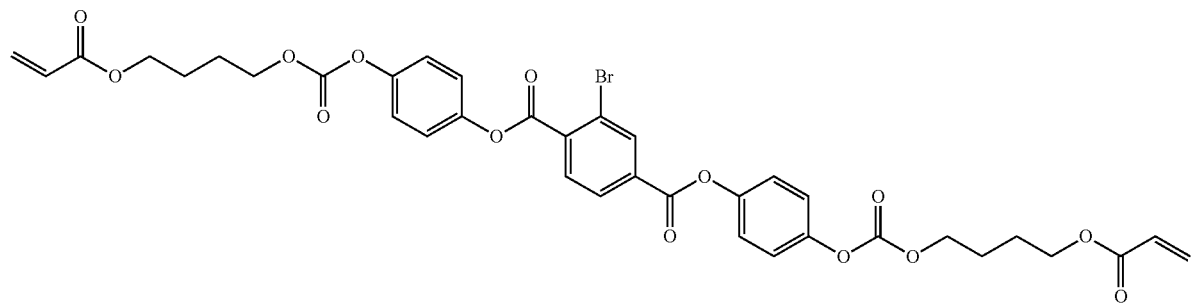

-continued
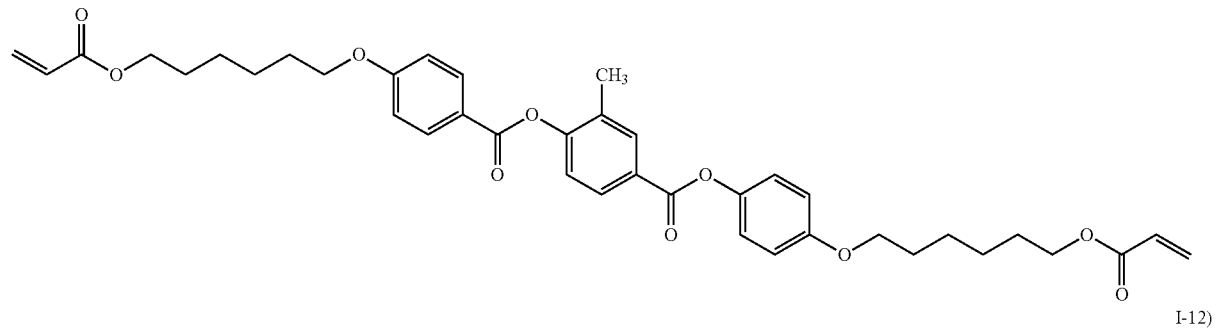
I-11)
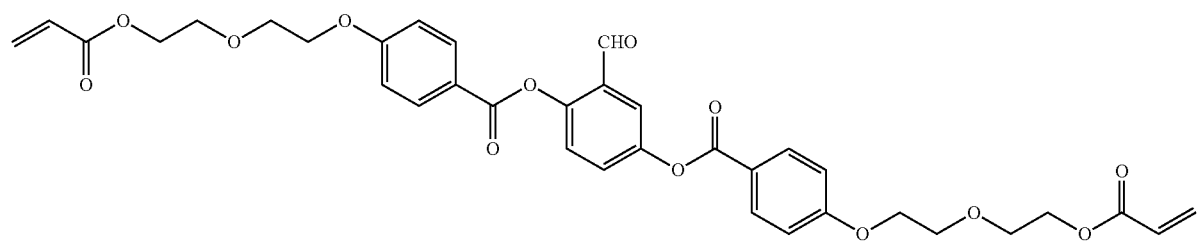
I-12)
[Formula 4]
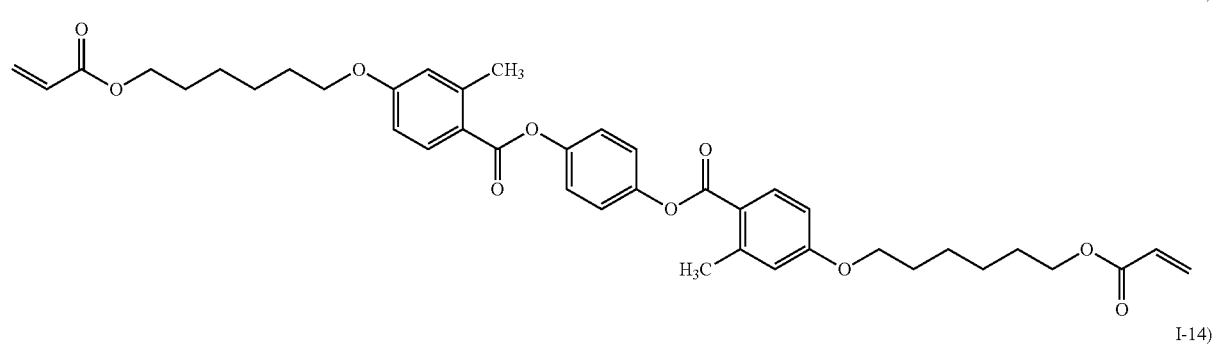
I-13)
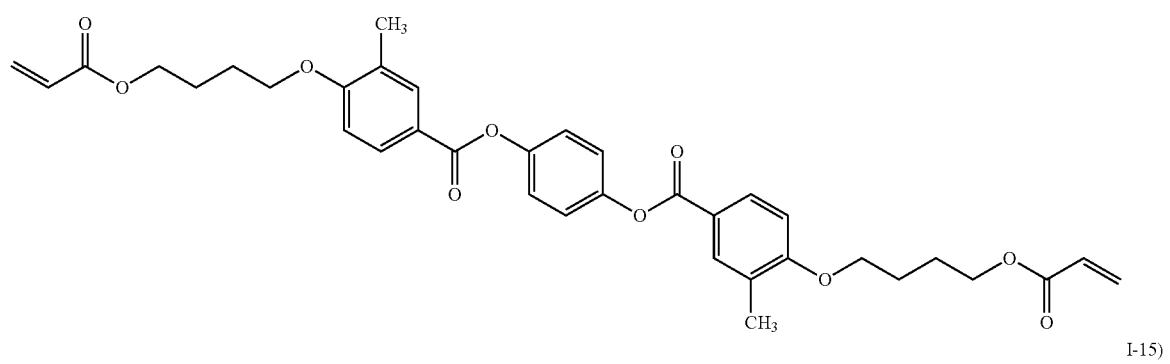
I-14)
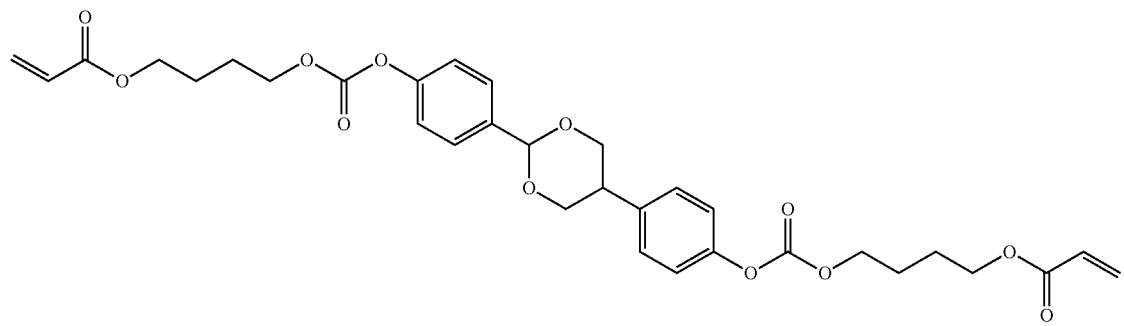
I-15)

-continued
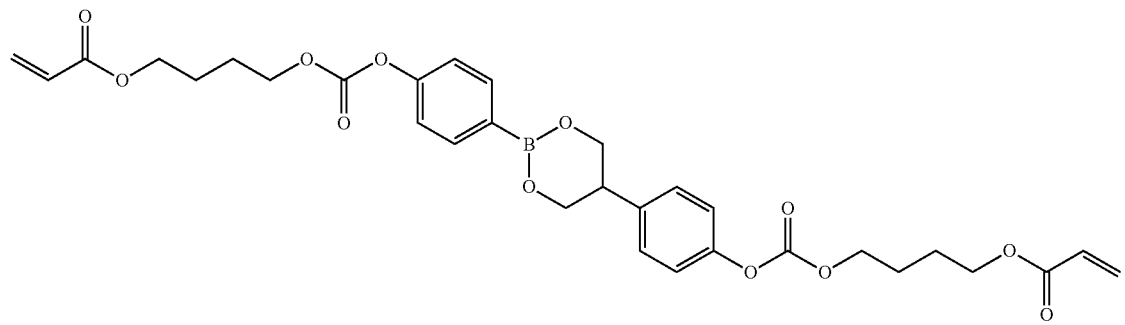
I-16)
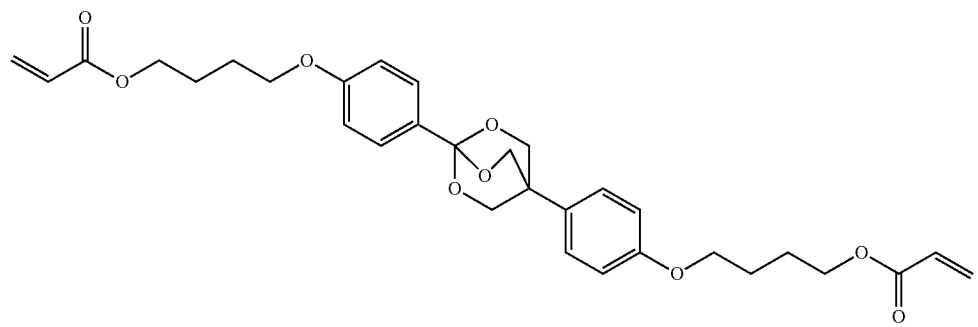
I-17)
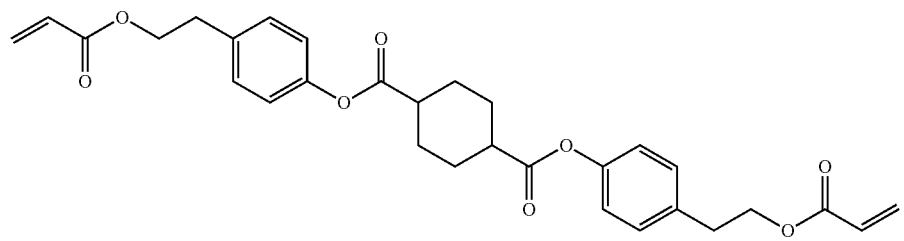
I-18)
[Formula 5]
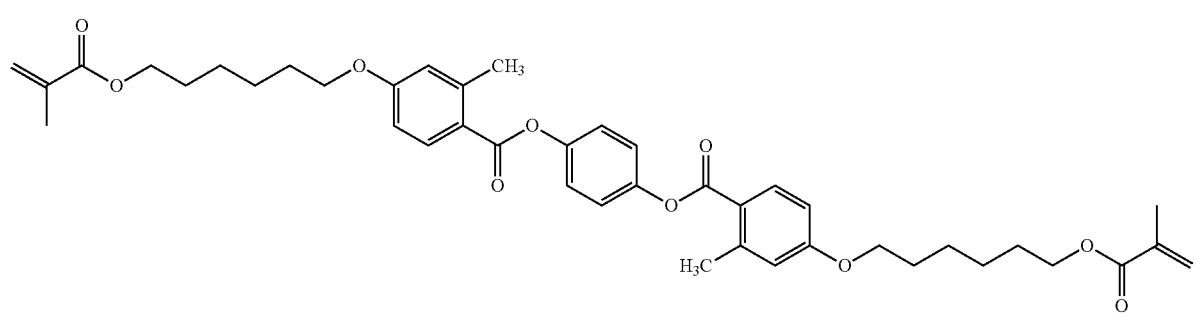
I-19)
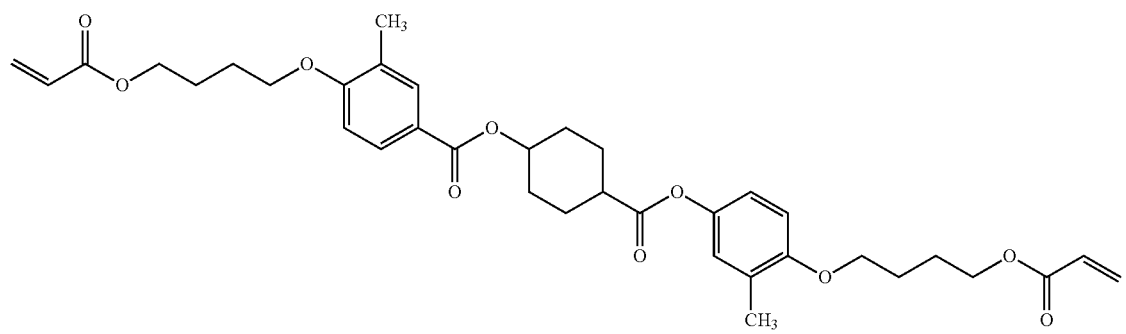
I-20)

-continued

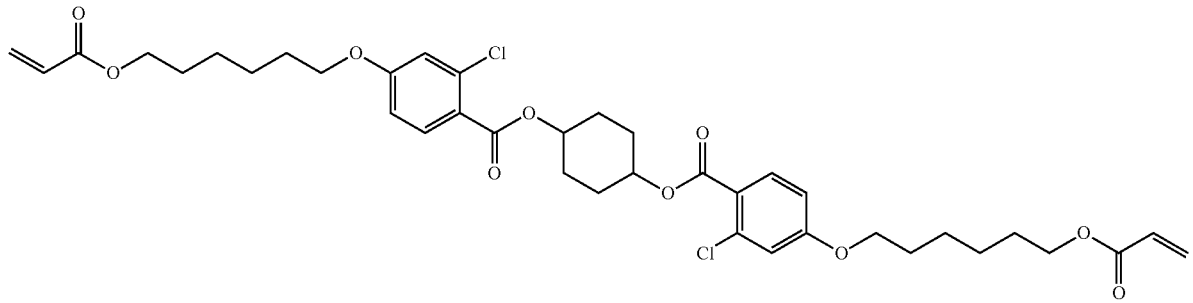

I-21)

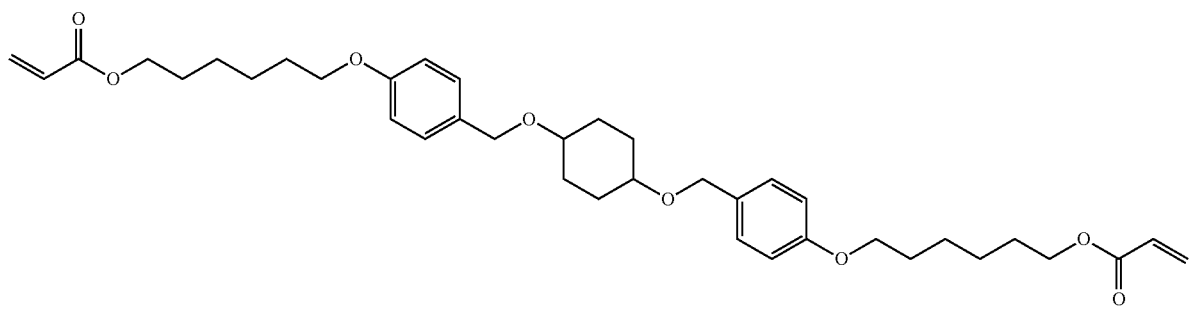

I-22)

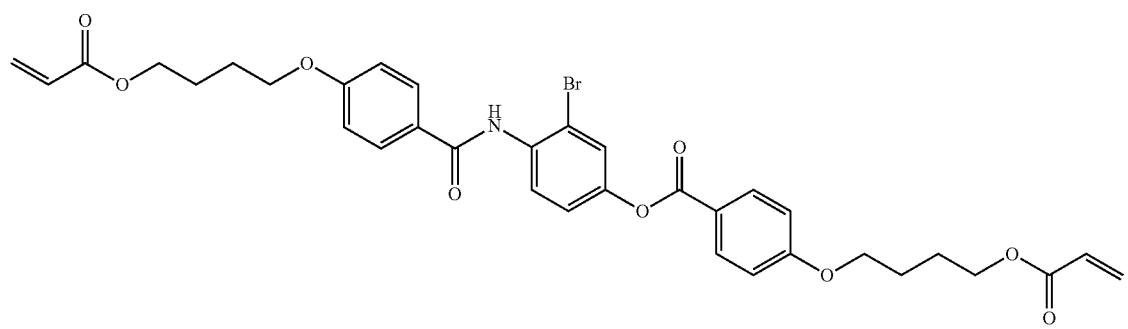

I-23)

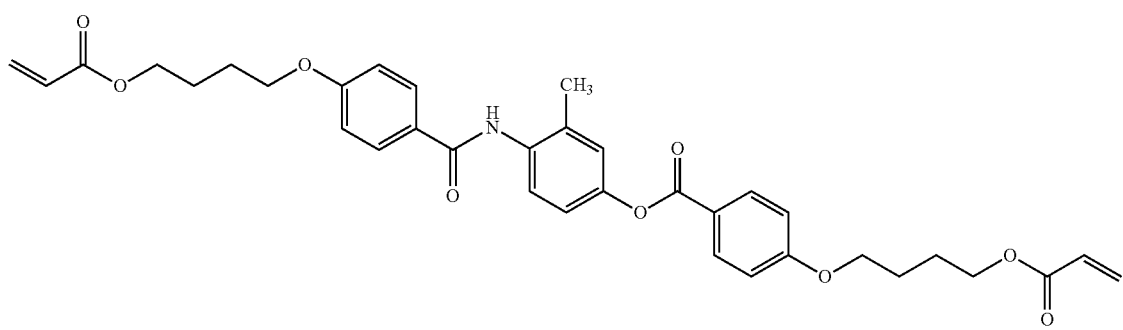

I-24)

In this embodiment, a photocurable discotic liquid crystal compound can be used as the photocurable liquid crystal compound. The discotic liquid crystal compound is preferably aligned substantially vertically (at an average tilted angle, in the range of 50 to 90 degrees) with respect to the polymer film surface. Discotic liquid crystal compounds are disclosed in various documents (C. Destrade et al., "Mol. Crysr. Liq. Cryst.", vol. 71, page 111 (1981); Chemical Society of Japan, "Kikan Kagaku sosetsu", No. 22, Chemistry of Liquid Crystal, Chapter 5, and Chapter 10, Section 2 (1994); B. Kohne et al., "Angew. Formula Soc. Chem, Comm.", page 1794 (1985); and J. Zhang et al., "J. Am. Formula Soc.", vol. 116, page 2655 (1994)). The polymerization of discotic liquid crystal compounds is described in Japanese Patent Application Laid-Open No. 8-27284. In order to fix a discotic liquid crystal compound by polymerization, it is necessary that a polymerizable group be attached as a substituent to the discotic core of the discotic liquid crystal compound. However, if a polymerizable group is directly attached to the discotic core, it will be difficult to maintain an alignment in the polymerization reaction. For this reason, a linker group is introduced between the discotic core and polymerizable group. Specifically, the photocurable discotic liquid crystal compound is preferably a compound represented by the following Formula (II):

$$D(-L-P)_n \qquad \text{Formula (II)}$$

wherein D is a discotic core, L is a divalent linker group, P is a polymerizable group, and n is an integer of 4 to 12.

Specifically, preferable examples of the discotic core (D), divalent linker group (L), and polymerizable group (P) in Formula (II) above, are (D1) to (D15), (L1) to (L25), and (P1) to (P18), respectively, disclosed in Japanese Patent Application Laid-Open No. 2001-4837. Those disclosed in this patent publication can be preferably used herein.

Additionally, an additive for alignment control, as well as an additive for liquid crystal alignment can be added to the liquid crystal layer coating solution. Substances disclosed in Japanese Patent Application Laid-Open No. 2004-145071 can be used as such additives.

The optical compensation film produced by the process and apparatus described above can be used in a polarizer wherein at least one of the two films that sandwich a polarizing film from both surfaces is an optical compensation film.

The optical compensation film and polarizer according to this embodiment can be applied to liquid crystal displays (LCDs). The optical compensation film and polarizer can be preferably used in, for example, transmissive, reflective, or semi-transmissive liquid crystal displays of the modes such as twisted nematic (TN), super-twisted nematic (STN), vertical alignment (VA), in-plane switching (IPS), and optically compensated bend cells (OCB).

EXAMPLES

The process for producing an optical compensation film, and the optical compensation film according to the present invention will be described in detail below, referring to Examples; however, the invention is not limited to these Examples.

Example 1

80 μm thick cellulose triacetate (FUJITAC, manufactured by Fujifilm Corporation) was immersed in 2.0 N potassium hydroxide solution (25° C.) for 2 minutes, and subsequently neutralized with sulfuric acid, washed with pure water and dried. Next, a coating solution of the composition shown below was applied with a #16 wire bar coater. The solution was dried with 60° C. hot air for 60 seconds, and further with 90° C. hot air for 150 seconds, thus forming a film. The resulting film was subsequently subjected to rubbing treatment in parallel with the longitudinal direction of the film, thereby producing a film with an alignment layer.

[Coating Solution for Forming Alignment Layer]
The modified polyvinyl alcohol shown below: 10 parts by mass
Water: 371 parts by mass
Methanol: 119 parts by mass
Glutaraldehyde: 0.5 parts by mass

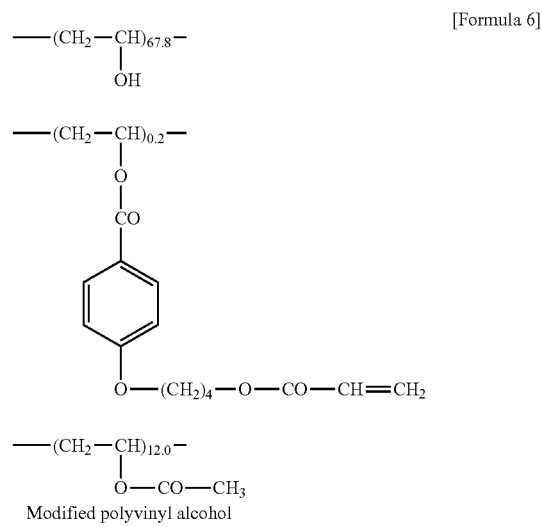

Modified polyvinyl alcohol

Next, the liquid crystal layer coating solution shown below was prepared, and the coating solution was applied to the film with an alignment layer prepared above. Methyl ethyl ketone, i.e., the solvent of the coating solution, was evaporated at room temperature, and the film was subsequently subjected to the drying step in the drying zone for 2 minutes at a coating film temperature of 130° C. After this, as shown in FIG. 6, the cooling zone was cooled using cooling air, and the film was allowed to stay for 15 seconds while being irradiated with ultraviolet rays at a coating film temperature of 80° C., thereby curing the liquid crystal layer to form an optically anisotropic layer. Next, the heating zone was heated using hot air, and the film was heated in the heating zone using hot air; the film was further heated using a heating roller, and allowed to stay for 15 seconds while being irradiated with ultraviolet rays at a coating film temperature of 110° C., thereby curing the alignment layer. Lastly, the film was wound up by a winder, thereby producing an optical compensation film of Example 1.

[Liquid Crystal Layer Coating Solution]

The coating solution was prepared by dissolving the composition shown below in 107 parts by mass of methyl ethyl ketone. The coating solution was adjusted to a desired viscosity by adjusting the amount of methyl ethyl ketone.

The discotic liquid crystal compound shown below: 41.01 parts by mass

Ethylene oxide-modified trimethylolpropane triacrylate (V#360, manufactured by Osaka Organic Chemical Industry Ltd.): 4.06 parts by mass Cellulose acetate butyrate (CAB551-0.2, manufactured by Eastman Chemical Company): 0.9 parts by mass Cellulose acetate butyrate (CAB531-1, manufactured by Eastman Chemical Company): 0.21 parts by mass fluoro-aliphatic group-containing polymer (Megafac F780, manufactured by Dainippon Ink Corporation): 0.14 parts by mass Photo-polymerization initiator (Irgacure 907, manufactured by Ciba-Geigy Ltd.): 1.35 parts by mass Sensitizer (Kayacure DETX, manufactured by Nippon Kayaku Co., Ltd.): 0.45 parts by mass

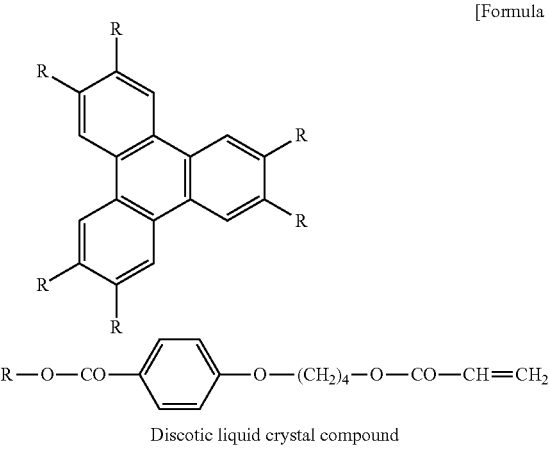

[Formula 7]

Discotic liquid crystal compound

Examples 2 to 8, and Comparative Examples 1 and 2

Optical compensation films were produced according to the same process as described in Example 1, except that the drying temperature and ultraviolet radiation temperatures (during cooling and heating) were varied as shown in Table 1.

<Evaluation>

<<Alignment>>

Each of the optical compensation films was observed under a polarizing microscope to examine its alignment. The alignment was evaluated based on the following criteria:

Excellent: No Schlieren defects were formed, and uniform alignment was achieved.

Good: A small number of submicroscopic Schlieren defects were formed, but the defects were negligible for the film to be used as a commercial product.

Pass: A small number of submicroscopic Schlieren defects were formed, causing the degree of extinction to rise, but the defects were negligible for the film to be used as a commercial product.

Fail: Schlieren defects were formed, or the film was not aligned, and thus, not usable as a commercial product.

The degree of extinction was measured using Win6OD (manufactured by Otsuka Electronics Co., Ltd.).

<<Curing of Alignment Layer>>

Each of the optical compensation films was immersed in water at 40° C. for 30 minutes, and then withdrawn from the warm water. The film was rubbed bidirectionally 25 times with a nonwoven cloth under a load of 500 g, and the rubbed film was visually examined for peeling of the alignment layer. The curing of the alignment layer was evaluated based on the following criteria:

Excellent: The alignment layer maintained strong adhesion strength, and did not peel at all.

Good: Peeling was not observed, but a decrease in adhesion strength was observed. The decrease in adhesion strength was negligible in a heat- and humidity-resistant environment for product use.

Pass: Peeling was not observed, but a significant decrease in adhesion strength was observed. This may cause problems depending on the heat and humidity environment.

Fail: The alignment layer exhibited low adhesion strength such that peeling would easily occur; thus, the film was not usable as a commercial product.

<<Curing of Optically Anisotropic Layer>>

Each of the optical compensation films was scratched with a needle under a load of 30 g, and the scratched film was examined visually and under a microscope for scratches on the optically anisotropic layer. The curing of the optically anisotropic layer was evaluated based on the following criteria:

Excellent: No scratches (microscopic defects) were seen even under a microscope.

Good: A small number of scratches (microscopic defects) were observed under a microscope, but not visually observed; thus, the defects were negligible for the film to be used as a commercial product.

Pass: An increased number of scratches (microscopic defects) were seen under a microscope, degrading the product quality.

Fail: Scratches were readily visually observable, and the film was not usable as a commercial product.

<<Film Flatness>>

Each of the rolls of the optical compensation films was cut in the longitudinal direction, providing a 1 m long portion, and the portion was horizontally placed on a flat table and visually examined. The film flatness was evaluated based on the following criteria:

Good: No corrugated streaks were observable in the longitudinal direction.

Pass: A small number of corrugated streaks were not observable in the longitudinal direction.

Fail: Corrugated streaks were observable in the longitudinal direction, and the film was not usable as a commercial product.

<<Contrast/Viewing Angle Characteristics and Hue>>

One surface of a polarizing element was laminated to the substrate surface of each of the optical compensation films using a polyvinyl alcohol adhesive, and a cellulose triacetate film whose surface had been saponified was laminated to the other surface of the polarizing element, thereby preparing a polarizer. Liquid crystal panels each incorporating the thus-prepared polarizer were evaluated in terms of upward contrast/viewing angle and blue hue.

Excellent: The contrast, viewing angle characteristics, and blue hue were within the product specification, showed few variations and satisfactory.

Good: The contrast, viewing angle characteristics, and blue hue were within the product specification, but showed slight variations.

Pass: The contrast, viewing angle characteristics, and blue hue showed variations, with some variations falling outside the product specification.

Fail: The contrast, viewing angle characteristics, and blue hue showed significant variations, falling outside the product specification, and thus, the liquid crystal panel was unacceptable as a commercial product.

<<Overall Evaluation>>

Each of the optical compensation films was evaluated as excellent to fail, based on an overall assessment of the items above. FIG. 10 is a table showing the results of the overall assessment of the items above. As can be seen from Table 1 shown in FIG. 10, optical compensation films of satisfactory quality were produced in Examples 1 to 3. In Comparative Example 1 wherein the curing temperature of the liquid crystal layer (the ultraviolet radiation temperature during cooling) was as high as the curing temperature of the alignment layer (the ultraviolet radiation temperature during heating), the optical compensation film exhibited degraded optical properties. By contrast, in Comparative Example 2 wherein the ultraviolet radiation temperature during heating was as low as the ultraviolet radiation temperature during cooling, the alignment layer and optically anisotropic layer were not cured. In Example 4 wherein the ultraviolet radiation temperature during cooling was lowered, the optical compensation film was of acceptable quality as a commercial product; however, peeling of the alignment layer and scratches on the optically anisotropic layer were observed.

In each of Examples 5, 7, and 8 wherein the drying temperature and ultraviolet radiation temperature during heating were 140° C. or more, which exceeded the Tg of the transparent substrate, the optical compensation film was unable to maintain the flatness of the transparent substrate, and also exhibited decreased flatness of the optical compensation film itself.

The invention claimed is:

1. A process for producing an optical compensation film comprising the steps of:
    a liquid crystal layer application step of applying a liquid crystal layer coating solution containing a liquid crystal compound to an alignment layer on a surface of a transparent substrate that is continuously transported;
    a liquid crystal layer drying step of drying the liquid crystal layer;
    a cooling and curing step of curing the liquid crystal layer while cooling the liquid crystal layer to a temperature lower than a drying temperature used in the drying step; and
    a heating and curing step of curing the alignment layer while heating the alignment layer to a temperature higher than a cooling temperature used in the cooling and curing step.

2. The process for producing an optical compensation film according to claim 1, wherein the liquid crystal layer and alignment layer are cured by ultraviolet radiation.

3. The process for producing an optical compensation film according to claim 1, wherein
    the temperature of the liquid crystal layer in the liquid crystal layer drying step is 120° C. or more and 140° C. or less;
    the temperature of the liquid crystal layer in the cooling and curing step is 40° C. or more and 100° C. or less; and
    the temperature of the alignment layer in the heating and curing step is 100° C. or more and 135° C. or less.

4. The process for producing an optical compensation film according to claim 1, wherein
    the cooling and curing step comprises:
    a cooling step of lowering the temperature of the liquid crystal layer; and
    a curing step of curing the liquid crystal layer while maintaining the temperature after cooling.

5. The process for producing an optical compensation film according to claim 1, wherein
    the heating and curing step comprises:
    a heating step of heating the alignment layer; and
    a curing step of curing the alignment layer while maintaining the temperature after heating.

6. An apparatus for producing an optical compensation film comprising:
    a substrate transporting apparatus that continuously transports a transparent substrate having an alignment layer formed on a surface of the substrate;
    a coating apparatus that applies a liquid crystal layer coating solution containing a liquid crystal compound to the transparent substrate;
    a drying apparatus that dries the liquid crystal layer coating solution to form a liquid crystal layer;
    a curing apparatus that cures the alignment layer and liquid crystal layer;
    a cooling apparatus present in an upstream portion of the curing apparatus, the cooling apparatus cooling the alignment layer and liquid crystal layer; and
    a heating apparatus present in a downstream portion of the curing apparatus, the heating apparatus heating the alignment layer and liquid crystal layer.

7. The apparatus for producing an optical compensation film according to claim 6, wherein the curing apparatus is an ultraviolet radiation apparatus.

8. The apparatus for producing an optical compensation film according to claim 6, wherein
    the curing apparatus comprises four or more zones, wherein
    two or more zones upstream of the curing apparatus each comprise the cooling apparatus, and at least one of the zones comprises a curing portion; and
    two or more zones downstream of the curing apparatus each comprise the heating apparatus, and at least one of the zones comprises a curing portion; and wherein
    the temperature in each of the four or more zones can be controlled.

9. The apparatus for producing an optical compensation film according to claim 6, wherein the cooling apparatus is cooling air from a nozzle or slit plate, or a cooling roll capable of adjusting temperature.

10. The apparatus for producing an optical compensation film according to claim 6, wherein the heating apparatus is a heating roll capable of adjusting temperature.

11. The apparatus for producing an optical compensation film according to claim 6, wherein
    the temperature of the liquid crystal layer in the drying apparatus is 120° C. or more and 140° C. or less;
    the temperature of the liquid crystal layer in the cooling apparatus is 40° C. or more and 100° C. or less; and
    the temperature of the alignment layer in the heating apparatus is 100° C. or more and 135° C. or less.

12. An optical compensation film produced by the process for producing an optical compensation film according to claim 1.

13. A polarizer comprising at least one optical compensation film according to claim 12.

14. A liquid crystal display comprising the optical compensation film according to claim 12.

15. A liquid crystal display comprising the polarizer according to claim 13.

* * * * *